United States Patent
Boffa et al.

(10) Patent No.: US 10,775,273 B2
(45) Date of Patent: Sep. 15, 2020

(54) METHOD AND LINE FOR CHECKING TYRES FOR VEHICLE WHEELS

(71) Applicant: Pirelli Tyre S.p.A., Milan (IT)

(72) Inventors: Vincenzo Boffa, Milan (IT); Marco Cantu', Milan (IT); Fabio Regoli, Milan (IT); Valeriano Ballardini, Milan (IT)

(73) Assignee: PIRELLI TYRE S.p.A., Milan (IT)

( * ) Notice: Subject to any disclaimer, the term of this patent is extended or adjusted under 35 U.S.C. 154(b) by 207 days.

(21) Appl. No.: 15/775,708

(22) PCT Filed: Nov. 17, 2016

(86) PCT No.: PCT/IB2016/056914
§ 371 (c)(1),
(2) Date: May 11, 2018

(87) PCT Pub. No.: WO2017/085651
PCT Pub. Date: May 26, 2017

(65) Prior Publication Data
US 2018/0328819 A1 Nov. 15, 2018

(30) Foreign Application Priority Data
Nov. 19, 2015 (IT) .............................. UB2015A5721

(51) Int. Cl.
*G06T 7/00* (2017.01)
*G01M 17/02* (2006.01)
*G01B 11/25* (2006.01)

(52) U.S. Cl.
CPC ........... *G01M 17/027* (2013.01); *G01B 11/25* (2013.01); *G06T 7/0002* (2013.01)

(58) Field of Classification Search
CPC ..... G01B 11/25; G01M 17/027; G06T 7/0002
See application file for complete search history.

(56) References Cited

U.S. PATENT DOCUMENTS

| 7,177,740 B1* | 2/2007 | Guangjun | G01C 1/06 356/139.09 |
| 2005/0219519 A1* | 10/2005 | Harding | G01N 21/8806 356/237.2 |

(Continued)

FOREIGN PATENT DOCUMENTS

| CN | 1566903 A | 1/2005 |
| CN | 105378447 A | 3/2016 |

(Continued)

OTHER PUBLICATIONS

International Search Report form the European Patent Office in corresponding International Application No. PCT/IB2016/056914 dated Mar. 15, 2017.

(Continued)

*Primary Examiner* — Nitav G Patel
(74) *Attorney, Agent, or Firm* — Finnegan, Henderson, Farabow, Garrett & Dunner, L.L.P.

(57) ABSTRACT

The invention relates to a method and line for checking a tyre (2) for vehicle wheels in which it is provided to determine whether the tyre (2) is made according to a known model among a plurality of known models. If the tyre (2) is made according to a known model, the tyre (2) is inspected to search for any manufacturing defects by acquiring data representative of at least part of the surface of the tyre (2) through a set of image acquisition devices (282) set according to a setting associated with the known model of the tyre. If the tyre (2) is made according to an unknown model, the following steps are carried out in succession: •acquiring a first profile (300) of the tyre (2), wherein the acquisition of said first profile comprises acquiring at least a first part (301, 302) of the first profile (300) through first profile-acquisition devices (280) arranged according to predetermined positions; •determining a setting for second profile-acquisition devices (278) based on the first profile (300) acquired;

(Continued)

•acquiring a second profile (400) of the tyre (2) through the second profile-acquisition devices (278) set according to the respective determined setting; •determining a setting for said set of image acquisition devices (282) based on the second profile (400) acquired; •cataloguing said unknown model as a known model and adding it to said plurality of known models, associating the setting thus determined therewith.

31 Claims, 9 Drawing Sheets

(56) References Cited

U.S. PATENT DOCUMENTS

| | | |
|---|---|---|
| 2014/0270466 A1 | 9/2014 | Dam et al. |
| 2015/0109626 A1 | 4/2015 | Harris |
| 2016/0225128 A1 | 8/2016 | Krolczyk et al. |

FOREIGN PATENT DOCUMENTS

| | | |
|---|---|---|
| CN | 105849524 A | 8/2016 |
| DE | 10 2012 02454 | 6/2014 |
| WO | WO 2015/044194 A1 | 4/2015 |
| WO | WO 2015/058201 A1 | 4/2015 |

OTHER PUBLICATIONS

Written Opinion of the International Searching Authority from the European Patent Office in corresponding International Application No. PCT/IB2016/056914 dated Mar. 15, 2017.

Notification of the First Office Action dated Jun. 12, 2019, from the China National Intellectual Property Administration, in counterpart Chinese Application No. 2016800067436.X.

\* cited by examiner

METHOD AND LINE FOR CHECKING TYRES FOR VEHICLE WHEELS

This application is a national phase application based on PCT/IB2016/056914, filed Nov. 17, 2016, and claims the priority of Italian Patent Application No. UB2015A005721, filed Nov. 19, 2015; the content of each application is incorporated herein by reference.

The invention concerns a method and a line for checking tyres for vehicle wheels.

The present invention is in the field of checks carried out on tyres, preferably moulded and vulcanized, adapted for verifying that they comply with the design specifications and, in particular, for detecting possible external defects (on the radially outer and/or radially inner surfaces) and/or defects inside the structure of the tyre and thus for allowing the compliant ones to be sent to storage and the defective ones to be discarded.

A tyre for vehicle wheels typically comprises a carcass structure, shaped according to a substantially toroidal configuration, comprising at least one carcass ply having respectively opposite end portions. The latter are engaged with respective annular anchoring structures, each of them normally formed from at least one substantially circumferential annular insert called "bead core" on which at least one filling insert is generally applied, tapering radially away from the axis of rotation. The annular anchoring structures are arranged in areas usually identified with the name "beads". The beads have an internal diameter substantially corresponding to a so-called "fitting diameter" of the tyre on a respective assemby rim. The tyre also comprises a crown structure comprising at least one belt strip arranged in position radially outside the carcass ply with respect to the centre of the tyre and a tread band radially outside the belt strip. Longitudinal and transversal grooves are typically formed into the tread band, arranged to define a desired tread pattern. Between the tread band and the belt strip(s) there can be a so-called "under-layer" made of elastomeric material having properties suitable for ensuring a stable connection of the belt strip(s) with the tread band itself. The tyre also comprises a pair of so-called sidewalls made of elastomeric material that represent the axially outer surfaces of the tyre, with respect to a middle plane perpendicular to the axis of rotation of the same tyre. For example, the sidewalls represent the axially outer surfaces with respect to the annular anchoring structures, to the carcass ply(-ies), to the belt strip(s) and possibly to at least one tread band portion. In "tubeless" tyres, in a radially inner position with respect to the carcass ply, there is at least one layer of elastomeric material, usually called "liner", having air-tightness characteristics and generally extending from one bead to the other.

The production cycles of a tyre provide that, after a building process in which the various structural components of the tyre itself are made and/or assembled, the built green tyres are transferred in a moulding and vulcanization line where a moulding and vulcanization process is carried out, adapted to define the structure of the tyre according to a desired geometry and tread pattern.

The term "elastomeric material" is meant to indicate a composition comprising at least one elastomeric polymer and at least one reinforcing filler. Such a composition can also comprise additives like, for example, a cross-linking agent and/or a plasticizer. Thanks to the presence of the cross-linking agent, such a material can be cross-linked through heating, so as to form the final manufactured product.

The term "green tyre" is meant to indicate a tyre obtained by the building process and not yet moulded and vulcanized.

The term "finished tyre" is meant to indicate a finished tyre obtained from the building process and subsequently moulded and vulcanized.

The term "tyre" is meant to indicate a finished tyre or a green tyre.

The term "model" of a tyre is meant to indicate a set of geometric characteristics that distinguish a tyre, in other words, for example, width of the section, height of the sidewalls, fitting diameter and/or external diameter.

The terms "axial", "axially", "radial", "radially", "circumferential" and "circumferentially" are used with reference to the tyre.

In particular, the terms "axial" and "axially" are meant to indicate references/magnitudes arranged/measured or extending in a direction substantially parallel to the axis of rotation of the tyre.

The terms "radial" and "radially" are meant to indicate references/magnitudes arranged/measured or extending in a direction that intersects the axis of rotation of the tyre and lies in a plane perpendicular to such an axis of rotation.

The terms "circumferential" and "circumferentially" are meant to indicate references/magnitudes arranged/measured or extending along a circumference developing around the axis of rotation of the tyre.

The term "tyre profile" is meant to indicate the perimeter of at least part of the surface of the tyre, preferably of at least one from the radially outer surface and the radially inner surface of the tyre. Preferably, it is meant the perimeter taken on a radial section plane that contains the axis of rotation of the tyre.

The terms "low resolution" and "high resolution" are meant to indicate resolutions that differ from one another. Preferably "low resolution" and "high resolution" are resolutions that differ from one another by at least 3 times, in the sense that the high resolution can allow two distinct points to be identified three times closer with respect to the identification of the same points as allowed by the low resolution. This means, for example, that if the low resolution is 0.3 mm the high resolution is less than or equal to 0.1 mm.

The term low resolution can, for example, mean a resolution greater than or equal to 0.3 mm, preferably comprised between about 0.3 mm and about 2 mm and even more preferably between about 0.3 mm and about 5 mm.

The term high resolution can, for example, mean a resolution of less than 0.3 mm, preferably comprised between about 0.01 mm and less than 0.3 mm and even more preferably comprised between about 0.05 mm and less than 0.3 mm.

The term "to set" is meant to indicate the action of arranging a device to operate according to determined parameters, in particular to be positioned according to predetermined coordinates (for example Cartesian coordinates of the barycentre of the device and Euler angles) that identify the position of said device in space relative to a reference system (for example Cartesian).

The term "setting" is meant to indicate a set of parameters that regulates the operation of a device, in particular a set of coordinates that regulate the positioning of the device in space relative to a reference system (for example Cartesian).

The term "known model" of tyre is meant to indicate a model of tyre for which a setting for a set of image acquisition devices is available.

The term "unknown model" of tyre is meant to indicate a model of tyre for which a setting for a set of image acquisition devices is not available.

The term "axial half of the tyre" is meant to indicate a half of the tyre delimited by an axial middle plane perpendicular to the axis of rotation of the tyre and equidistant from the beads of the tyre itself.

The term "at least one axial half of the tyre" is meant to indicate a complete half as defined above plus, possibly, a further portion of the other half that extends axially from the aforementioned middle plane.

The term "radial half of the tyre" is meant to indicate a half of the tyre delimited by a radial middle plane that comprises the axis of rotation of the tyre.

The term "at least one radial half of the tyre" is meant to indicate a complete half as defined above plus, possibly, a further portion of the other half that extends circumferentially from the aforementioned middle plane.

The term "building/production cycle time" is meant to indicate the time that passes between the exit of a built/finished tyre from the building/production line, and the exit of the next tyre.

The term "checking cycle time" is meant to indicate the time that passes between the exit of a checked tyre from the checking line and the exit of the next tyre.

The terms "low", "high", "under" and "over" identify the relative position of an element, like for example a component of a tyre, a tyre, an apparatus, a device, etc., with respect to the ground or of one of said elements with respect to another element.

In a production process, the tyres are subjected to checks in order to verify the possible presence of production defects and/or anomalies.

WO 2015/044194 discloses a method and line for inspecting tyres in which: a first macroscopic inspection post comprises means for rotating a tyre and for acquiring a macroscopic image of a tyre and means for comparing the macroscopic image with a reference image that is representative of a desired toroidal shape and detecting possible variations in shape; a second microscopic inspection post comprises means for rotating a tyre and for acquiring a microscopic image of a tyre and means for comparing the microscopic image with a reference image that is representative of a desired surface condition and detecting possible local surface variations; transferring means for transferring the tyre from the first inspection post to discharge point or to the second inspection post.

WO 2015/058201 describes a system for digitalising the profile of a tyre while moving in a predefined area. The system comprises a chassis positioned close to the tyre within the predetermined area; a plurality of detection modules mounted on the chassis, where the modules capture a profile substantially of 270 degrees of the tyre inside the predetermined area; and a checking unit in communication with the detection modules for processing the data coming from the detection modules and correlating a space of coordinates associated with the detection modules with a space of common coordinates.

In automated systems for checking tyres, the Applicant has perceived the need to carry out an accurate check of all tyres coming out from a building/production line of tyres with times and modes that are compatible with the building/production cycle time set by the line itself and that make it possible, at least in normal operation of the production plant, to substantially eliminate the accumulation of tyres to be checked.

The Applicant has observed that this would be extremely advantageous so as to be able to retroact quickly on the building/production line and adjust the process parameters so that a possible defect can be eliminated or so that an anomaly that is not a true defect on the checked tyres can be eliminated and not result in real defects on subsequent tyres.

The Applicant has also perceived the need to carry out an accurate check of all tyres coming out from a building/production line of tyres, with times and modes that are compatible with the building/production cycle time, even in plants that produce a large number of different models of tyres that are different in size (fitting diameter, sidewall height, section width, external diameter etc.) and in type (automobile, motorcycle, truck, winter tyres, summer tyres, self-sealing tyres, run-flat tyres, etc.).

The Applicant has observed that in order to carry out accurate checks, capable of detecting even very small defects and/or defects located in areas (for example of the radially inner surface) of the tyre that are difficult to access for image acquisition devices, it is essential for the image acquisition devices to be accurately set in order to ensure the acquisition of precise images, at high resolution and properly focused, at the same time avoiding carrying out improper manoeuvres that can damage the devices themselves. In particular, the Applicant has observed that the setting of the image acquisition devices must be accurately determined according to the profile of the specific model of tyre being checked so as to take into account, for example, more or less rounded sidewalls, more or less pronounced sidewall height and the like; all this without impacting upon the checking times, in other words on the checking cycle time.

The Applicant has finally observed that when there is an unknown model of tyre to be checked, for example in the case of first operation of a checking line downstream of the building/production line or more frequently in the case of a new model of tyre to be checked, such setting can be determined with the necessary precision only with suitable passages of the tyre itself through the aforementioned checking line. Such passages, however, in order to allow, in normal operation, to keep the checking cycle time in line with the building/production cycle time must be performed simultaneously with the passages of other known models of tyres that, on the other hand, are subjected to regular checking.

More specifically, the Applicant has realised that it is necessary for the aforementioned checking line to operate without discontinuity for the passage of any number of models of tyres to be subjected to checking, whether they are known or not.

This problem is not faced by WO 2015/044194 which does not consider the checking of tyres of different models and describes a single and fixed positioning of the image acquisition devices with respect to the tyre.

Moreover, WO 2015/058201, although it describes the use of a system for digitizing the profile of tyres of different sizes, describes a single and fixed positioning of the image acquisition devices, irrespective of the geometric characteristics of the model of tyre, which are thus not sought or stored in any way. Moreover, it is limited to the acquisition of the external profile of the tyre through image acquisition devices positioned far from the path of the tyre. Such a system is therefore unable to ensure the acquisition of precise images, at high resolution and properly focused, of portions of the radially inner and outer surface of the tyre.

In this context, the Applicant has perceived that the problems outlined above can be overcome through a selflearning mechanism that makes it possible to automatically determine the optimal setting of the image acquisition devices to be used for checking tyres, taking into account the specific profile thereof.

More precisely, the Applicant has found that such problems can be overcome through: the acquisition of at least a first part of a first profile of a tyre through first profile-acquisition devices arranged according to predetermined positions, irrespective of the profile of the tyre; determining a setting for second profile-acquisition devices based on the first profile acquired; the acquisition of a second profile of the tyre through the second profile-acquisition devices set according to the setting thus determined and determining a definitive setting for a set of image acquisition devices based on the second profile acquired.

In accordance with a first aspect thereof, the invention relates to a method for checking a tyre for vehicle wheels.

Preferably, it is provided to determine whether the tyre is made according to a known model among a plurality of known models.

Preferably, if the tyre is made according to a known model, said tyre is inspected to search for any manufacturing defects, acquiring data representative of at least part of the surface of the tyre through a set of image acquisition devices set according to a setting associated with the known model of the tyre.

Preferably, if the tyre is made according to an unknown model, it is provided to acquire a first profile of the tyre, wherein the acquisition of said first profile comprises acquiring at least a first part of the first profile through first profile-acquisition devices arranged according to predetermined positions.

Preferably, it is provided to determine a setting for second profile-acquisition devices based on the first profile acquired.

Preferably, it is provided to acquire a second profile of the tyre through the second profile-acquisition devices set according to the respective determined setting.

Preferably, it is provided to determine a setting for said set of image acquisition devices based on the second profile acquired.

Preferably, it is provided to catalogue said unknown model as a known model and add it to said plurality of known models, associating the setting thus determined therewith.

The Applicant considers that, using the aforementioned solution, the method for checking tyres makes it possible to make an industrial-scale automated system for checking tyres built/produced in any production plant, including plants that produce a large number of models of tyres, even ones that are very different from one another, at the same time meeting the requirements outlined above with particular regard to the accuracy of the checks, to the compatibility with the building/production cycle time and to the flexibility and specificity of the entire checking system with regard to each model of tyre.

In accordance with a second aspect thereof, the invention relates to a checking line of a tyre for vehicle wheels.

Preferably, the checking line comprises a plurality of checking stations comprising a set of image acquisition devices, first profile-acquisition devices and second profile-acquisition devices; a storage wherein a plurality of known models of tyres is stored, to which corresponding predetermined setting are associated for the set of image acquisition devices; and a processor.

Preferably, if the tyre is made according to a known model among said plurality of known models, the processor is configured to have said tyre inspected to search for any manufacturing defects, by acquiring data representative of at least part of the surface of the tyre through the set of image acquisition devices set according to the setting associated with the known model of tyre.

Preferably, if the tyre is made according to an unknown model, the processor is configured to acquire a first profile of the tyre, wherein the acquisition of said first profile comprises acquiring at least a first part of the first profile through first profile-acquisition devices arranged according to predetermined positions.

Preferably, the processor is configured to determine a setting for the second profile-acquisition devices based on the first profile acquired.

Preferably, the processor is configured to acquire a second profile of the tyre through the second profile-acquisition devices set according to the determined setting.

Preferably, the processor is configured to determine a setting for said set of image acquisition devices based on the second profile acquired.

Preferably, the processor is configured to catalogue said unknown model as a known model and add it in said storage to said plurality of known models, associating the setting thus determined therewith.

In accordance with another aspect thereof, the invention relates to a method for determining the setting of a set of image acquisition devices in a work unit comprising said set of image acquisition devices, first profile-acquisition devices and second profile-acquisition devices.

Preferably, it is provided to acquire a first profile of the tyre, wherein the acquisition of said first profile comprises acquiring at least a first part of the first profile through first profile-acquisition devices arranged according to predetermined positions.

Preferably, it is provided to determine a setting for the second profile-acquisition devices based on the first profile acquired.

Preferably, it is provided to acquire a second profile of the tyre through the second profile-acquisition devices set according to the respective determined setting.

Preferably, it is provided to determine the setting for said set of image acquisition devices based on the second profile acquired.

The Applicant considers that the use of first profile-acquisition devices arranged according to predetermined positions, independent from the actual profile of the tyre, for the acquisition of at least a first part of tyre profile makes it possible to obtain a first profile, that is approximate but in any case indicative of the surface of the tyre, using the first devices positioned securely, in other words in positions that, for whatever model of tyre, are sufficiently far from the surface of the tyre to avoid accidental collisions that could damage such first devices. Moreover, the use of the first profile thus obtained for determining a setting for second profile-acquisition devices and the use of said setting for the acquisition of a second profile of the tyre makes it possible to position such second devices precisely with respect to the first profile, taking into account the specificities of the model of tyre (in other words, more or less rounded sidewalls, more or less high sidewall height and/or section width, and similar) and ensuring, on the one hand, the integrity of the devices and, on the other hand, obtaining an accurate second profile, through precise images, at high resolution and properly focused. Once acquired, the second profile, of higher quality, finally, makes it possible to further refine the definitive setting of the set of image acquisition devices of the checking line in order to further improve the quality of the profile acquired during subsequent checks, again protecting the integrity of the devices.

The Applicant also considers that the aforementioned procedure makes it possible to automatically determine the optimal setting of the set of image acquisition devices without the need to stop the checking line upon the arrival of an unknown model of tyre to be checked; all with times and modes that are compatible with the building/production cycle time set by the line itself and that make it possible, at least in normal operation of the production plant, to substantially eliminate the accumulation of tyres to be checked.

The invention, as a whole, thus makes it possible to make an industrial-scale automated system for checking tyres of models that are even very different from one other in size and/or shape, at the same time meeting the requirements outlined above with particular regard to the accuracy of the checks, to the compatibility with the building/production cycle time and to the flexibility and specificity of the entire checking system with regard to each tyre model.

The present invention in at least one of the aforementioned aspects can have at least one of the following preferred characteristics.

The method for determining the setting of the set of image acquisition devices is carried out at least in part automatically.

Preferably, the data representative of at least part of the surface of the tyre comprise data representative of at least part of the radially outer surface of the tyre.

Alternatively or in addition, the data representative of at least part of the surface of the tyre preferably comprise data representative of at least part of the radially inner surface of the tyre.

Preferably, the predetermined positions according to which the first devices are arranged during the acquisition of the at least a first part of first profile of the tyre are determined a priori, irrespective of the profile of the tyre; such a profile not being available before the acquisition of the at least a first part of first profile of the tyre.

Preferably, the first profile of the tyre is relative to at least part of the radially outer surface of the tyre. Alternatively or in addition, the first profile of the tyre is preferably relative to at least part of the radially inner surface of the tyre.

Preferably, the second profile of the tyre is relative to at least part of the radially outer surface of the tyre. Alternatively or in addition, the second profile of the tyre is preferably relative to at least part of the radially inner surface of the tyre.

Preferably, said at least a first part of the first profile is acquired at low resolution.

Preferably, the second profile is acquired at high resolution.

In a preferred embodiment, the setting for the second profile-acquisition devices is determined by determining coordinates for each device that identify at least one position that allows the device to acquire a portion of interest of said first profile, without interfering with said first profile and/or with another device.

Preferably, the portion of interest of said first profile is a radially outer or radially inner surface portion of the tyre.

In a preferred embodiment, for each device of said second profile-acquisition devices, said coordinates are determined through simulations that make it possible to identify portions of the first profile that are acquired by moving the device and that make it possible to move the device until said at least one position that allows the device to acquire (preferably within a predetermined depth of field and a predetermined field of view) said portion of interest of said first profile without interfering with said first profile and/or with another device, is identified.

Preferably, the simulations are carried out with the help of a suitable graphical interface that makes it possible to visualise the first profile, the device and the portions of the first profile that are acquired by moving the device.

In a preferred embodiment, the setting for the set of image acquisition devices is determined by determining coordinates for each device that identify at least one position that allows the device to acquire (preferably within a predetermined depth of field and a predetermined field of view) a portion of interest of said second profile, without interfering with said second profile and/or another device.

Preferably, the portion of interest of said second profile is a radially outer or radially inner surface portion.

In a preferred embodiment, for each device of the set of image acquisition devices, said coordinates are determined through simulations that make it possible to identify portions of the second profile that are acquired by moving the device and that make it possible to move the device until said at least one position that allows the device to acquire said portion of interest of said second profile without interfering with said second profile and/or another device, is identified.

Preferably, the simulations are carried out with the help of a suitable graphical interface that makes it possible to visualise the second profile, the image-acquisition device and the portions of the second profile that are acquired by moving the image-acquisition device.

Preferably, after said unknown model is catalogued as a known model, the tyre is inspected to search for any manufacturing defects by acquiring data representative of at least part of the surface of the tyre through the set of image acquisition devices set according to the setting determined for said unknown model.

Preferably, after said unknown model is catalogued as a known model, the method goes back to determining whether said tyre is made according to a known model among the plurality of known models.

In a preferred embodiment, each known model of said plurality of known models is associated with a reference surface image of tyre.

Preferably, the reference image is relative to a radially outer surface of tyre.

Preferably, the operation of inspecting said tyre to search for any manufacturing defects comprises comparing the data acquired, representative of at least part of the surface of the tyre (preferably the radially outer surface), with the reference image associated with the known model of the tyre.

Preferably, after having determined the setting for said set of image acquisition devices based on the second profile acquired, it is provided to acquire a surface image (preferably relative to the radially outer surface) of the tyre through the set of image acquisition devices set according to the setting thus determined, and to associate it, as reference image, with the unknown model after it has been catalogued as a known model.

Preferably, the operation of acquiring the first profile of the tyre further comprises the operation of acquiring a second part of said first profile through extrapolation from said first part.

Preferably, said second part of said first profile relates to a radially inner surface portion of the tyre. Preferably, said radially inner surface portion of the tyre is located at sidewalls and beads of the tyre.

Preferably, said at least a first part of the first profile telates to the radially outer surface of the tyre and to a radially inner surface portion and opposite to the tread band of the tyre.

In an alternative embodiment, the first profile of the tyre is acquired entirely through the first profile-acquisition devices arranged according to predetermined positions.

Preferably, the operation of acquiring said at least a first part of first profile of the tyre comprises the acquisition of images of at least one radially outer surface portion of the tyre through said first profile-acquisition devices.

Preferably, the operation of acquiring said at least a first part of first profile of the tyre comprises the acquisition of images of at least one radially inner surface portion of the tyre through said first profile-acquisition devices.

Preferably, the operation of acquiring said second profile of the tyre comprises the acquisition of images of at least one radially outer surface portion of the tyre through said second profile-acquisition devices.

Preferably, the operation of acquiring said second profile of the tyre comprises the acquisition of images of at least one radially inner surface portion of the tyre through said second profile-acquisition devices.

Preferably, the operation of inspecting said tyre to search for any manufacturing defects is carried out in a checking cycle time during the passage of the tyre along a checking path.

Preferably, the operation of acquiring said at least a first part of first profile of the tyre is carried out in the checking cycle time during the passage of the tyre along said checking path.

Preferably, the operation of determining the second part of said first profile through extrapolation from said first part is carried out offline, in other words when the tyre is outside of the checking path. This advantageously makes it possible to not impact upon the checking cycle time.

Preferably, the operation of determining the setting for the second profile-acquisition devices is at least in part carried out offline, in other words when the tyre is outside of the checking path. Considering the criticality of the operation of determining the setting of the devices, this advantageously allows an operator to supervise such an operation without impacting upon the checking cycle time.

Preferably, the operation of acquiring the second profile of the tyre is carried out in the checking cycle time during a further passage of the tyre along said checking path.

Preferably, the operation of determining the setting for said set of image acquisition devices is at least in part carried out offline, in other words when the tyre is outside of the checking path. Considering the criticality of the operation of determining the setting of the devices, this advantageously allows an operator to supervise such an operation without impacting upon the checking cycle time.

Preferably, in at least one from said operation of inspecting said tyre to search for any manufacturing defects, said operation of acquisition of said at least a first part of first profile and said operation of acquisition of said second profile, a circumferential exploration of the surface of the tyre is provided.

Preferably, a circumferential exploration of at least the radially outer or inner surface of the tyre is provided.

Preferably, a circumferential exploration of the surface of the tyre of at least one first axial half of the tyre and of at least one second axial half of the tyre is provided.

In a preferred embodiment, in said operation of inspecting said tyre to search for any manufacturing defects, the acquisition of data representative of at least part of the surface of the tyre comprises: the acquisition of data representative of at least part of the surface of at least a first axial half of the tyre; overturning the tyre about an overturning axis; and the acquisition of data representative of at least part of the surface of at least a second axial half of the tyre.

In a preferred embodiment, the acquisition of the second profile of the tyre comprises: the acquisition of images of at least a first axial half of the tyre; overturning the tyre about an overturning axis; and the acquisition of images of at least one second axial half of the tyre.

In a preferred embodiment, the acquisition of said at least a first part of the first profile of the tyre comprises: the acquisition of images of at least a first axial half of the tyre; overturning the tyre about an overturning axis; and the acquisition of images of at least one second axial half of the tyre.

Preferably, the overturning axis is perpendicular to the axis of rotation of the tyre and substantially belongs to an axial middle plane of the tyre that delimits said first axial half and said second axial half of the tyre.

Preferably, in said operation of inspecting said tyre to search for any manufacturing defects, during the acquisition of data representative of at least part of the surface of the tyre, the tyre is rotated about its axis of rotation with respect to the set of image acquisition devices that remains stationary, set according to said predetermined setting.

Preferably, the operation of acquiring said second profile comprises the acquisition of surface images of the tyre by rotating the tyre about its axis of rotation with respect to the second profile-acquisition devices which remain stationary, set according to the respective determined setting.

Preferably, the operation of acquiring said at least a first part of first profile comprises acquiring images of at least a radially inner surface portion of the tyre by rotating the tyre about its axis of rotation with respect to a first part of the first profile-acquisition devices, which remain stationary in the respective predetermined positions.

Preferably, the tyre is rotated by at least 360°.

Preferably, the operation of acquiring said at least a first part of first profile comprises acquiring images of at least a major part of the radially outer surface of the tyre, by translating the tyre along an advancing direction perpendicular to the axis of rotation of the tyre, with respect to a second part of the first profile-acquisition devices, which remain stationary in the respective predetermined positions.

Preferably, the operation of acquiring said at least a part of first profile comprises the formation of two slit lights on a plane substantially perpendicular to said advancing direction, adapted to illuminate as a whole said at least a major part of the radially outer surface of the tyre while it translates along said advancing direction.

Preferably, the first profile-acquisition devices are distinct from the second profile-acquisition devices and from the set of image acquisition devices.

Preferably, the second profile-acquisition devices are a subset of the set of image acquisition devices. In other words, the second profile-acquisition devices coincide with part of the devices of said set of image acquisition devices.

Preferably, the first profile-acquisition devices are adapted to acquire low resolution images.

Preferably, the second profile-acquisition devices are adapted to acquire high resolution images.

Preferably, the devices of the set of image acquisition devices are in part adapted to acquire three-dimensional images and in part adapted to acquire two-dimensional images.

Preferably, the devices of the set of image acquisition devices are in part adapted to acquire three-dimensional images and in part adapted to acquire two-dimensional images of at least part of the radially outer or inner surface of the tyre.

Preferably, the second profile-acquisition devices are adapted to acquire three-dimensional images.

Preferably, the second profile-acquisition devices are adapted to acquire three-dimensional images of at least part of the radially outer or inner surface of the tyre.

Preferably, the first profile-acquisition devices are adapted to acquire three-dimensional images.

Preferably, the first profile-acquisition devices are adapted to acquire three-dimensional images of at least part of the radially outer or inner surface of the tyre.

Preferably, the devices of the set of image acquisition devices, of said first profile-acquisition devices and of said second profile-acquisition devices each comprise a video camera, an illumination device and, possibly, a system of mirrors comprising at least one mirror.

Preferably, the illumination device comprises a laser source or LEDs.

Preferably the illumination device comprises an optic adapted to transform a punctiform laser light into a slit light.

Preferably, the devices of the set of image acquisition devices, of said second profile-acquisition devices and of a first part of said first profile-acquisition devices are operatively associated with respective support and moving devices.

In a preferred embodiment, the support and moving devices comprise at least one robotized arm, preferably anthropomorphic. Even more preferably, said anthropomorphic robotized arm has at least 5 axes.

Preferably, each robotized arm can carry one or more devices.

Preferably, a second part of the first profile-acquisition devices is supported by fixed support devices (not mobile).

Preferably, said second part of the first profile-acquisition devices is configured so as to acquire as a whole at least a major part of the radially outer surface (preferably of at least a first axial half) of the tyre while it advances along an advancing direction.

Preferably, said second part of the first profile-acquisition devices is positioned in a fixed manner on a plane substantially perpendicular to an advancing direction of the tyre along the checking line.

Preferably, said second part of the first profile-acquisition devices is configured so as to form two slit lights on a plane substantially perpendicular to said advancing direction of the tyre, the two slit lights being adapted for illuminating as a whole said at least a major part of the radially outer surface (preferably of at least a first axial half) of the tyre while it advances along said advancing direction.

Preferably, every slit light is adapted for illuminating at least a radial half of the tyre, defined by a radial middle plane of the tyre that comprises the axis of rotation of the tyre.

Preferably, at least part of the checking stations of the plurality of checking stations comprises a support for the tyre adapted for rotating the tyre about its axis of rotation.

Preferably, said rotation is by at least 360°.

Preferably, the support is adapted for rotating the tyre about its axis of rotation with respect to said first part of the first profile-acquisition devices, to the second profile-acquisition devices and to the set of image acquisition devices, suitably positioned.

Preferably, said support for the tyre comprises a conveyor belt adapted to transport the tyre along an advancing direction.

In a preferred embodiment, in said storage, each known model of said plurality of known models is associated with a corresponding reference surface image of tyre, preferably of radially outer surface of tyre.

Preferably, the processor is configured to inspect said tyre to search for any manufacturing defects comparing the data acquired, representative of the surface (preferably of the radially outer surface) of the tyre, with the corresponding reference image, associated with the known model of the tyre.

Preferably, after having determined the setting for said set of image acquisition devices based on the second profile acquired, the processor is configured to acquire a surface image (preferably of the radially outer surface) of the tyre through the set of image acquisition devices set according to the setting thus determined, and store it in said storage, as reference image, in association with the unknown model, after it has been catalogued as a known model.

In a preferred embodiment, the plurality of checking stations is organised in a first checking unit and a second checking unit, each comprising said set of image acquisition devices, said first profile-acquisition devices and said second profile-acquisition devices.

Preferably, an overturning and transport device is provided interposed between the first checking unit and the second checking unit and configured to overturn the tyre about an overturning axis.

Preferably, the first checking unit and the second checking unit are respectively adapted for operating on at least a first axial half of the tyre and on at least a second axial half of the tyre.

In a variant, the first checking unit and the second checking unit coincide and the overturning and transport device is configured to overturn the tyre coming from the outlet of said checking unit and to transfer it to the inlet of the same checking unit.

In another variant, the first checking unit and the second checking unit are distinct and arranged in succession in space and the overturning and transport device is configured to overturn the tyre coming from the first checking unit and transfer it into the second checking unit.

Preferably, the first checking unit and the second checking unit are substantially identical.

The processor is preferably located at least in part at the checking line.

The processor can be located at least in part in a remote station with respect to the checking line.

Further characteristics and advantages of the present invention will be made clear by the following detailed description of some example embodiments thereof, provided only as non-limiting examples, said description being made with reference to the attached drawings, in which:

FIG. 1 schematically shows a plant for producing tyres for vehicle wheels;

FIG. 2 shows a radial half-section of a tyre, taken in a plane that contains the axis of rotation and a radius of the tyre;

FIGS. 3a-3b schematically show an embodiment of a checking line of the plant of FIG. 1;

FIG. 4a schematically shows a part of first profile-acquisition devices adapted for acquiring images of the radially outer surface of at least a first axial half of the tyre;

FIG. 4b schematically shows another part of first profile-acquisition devices adapted for acquiring images of a radially inner surface portion with respect to the tread band of at least a first axial half of the tyre;

FIGS. 5a-5c schematically show various acquisition steps of the first profile of the radially outer and inner surface of at least the first axial half of the tyre;

FIGS. 6a-6d schematically show various acquisition steps of the second profile of the radially outer and inner surface of at least the first axial half of the tyre;

FIG. 7 schematically shows the operation of a simulation procedure adapted for defining the setting of the second profile-acquisition devices and of the set of image acquisition devices;

FIG. 8 schematically shows a flow diagram of a preferred embodiment of an algorithm that can be used to carry out the checking method of the invention.

Figure 2:
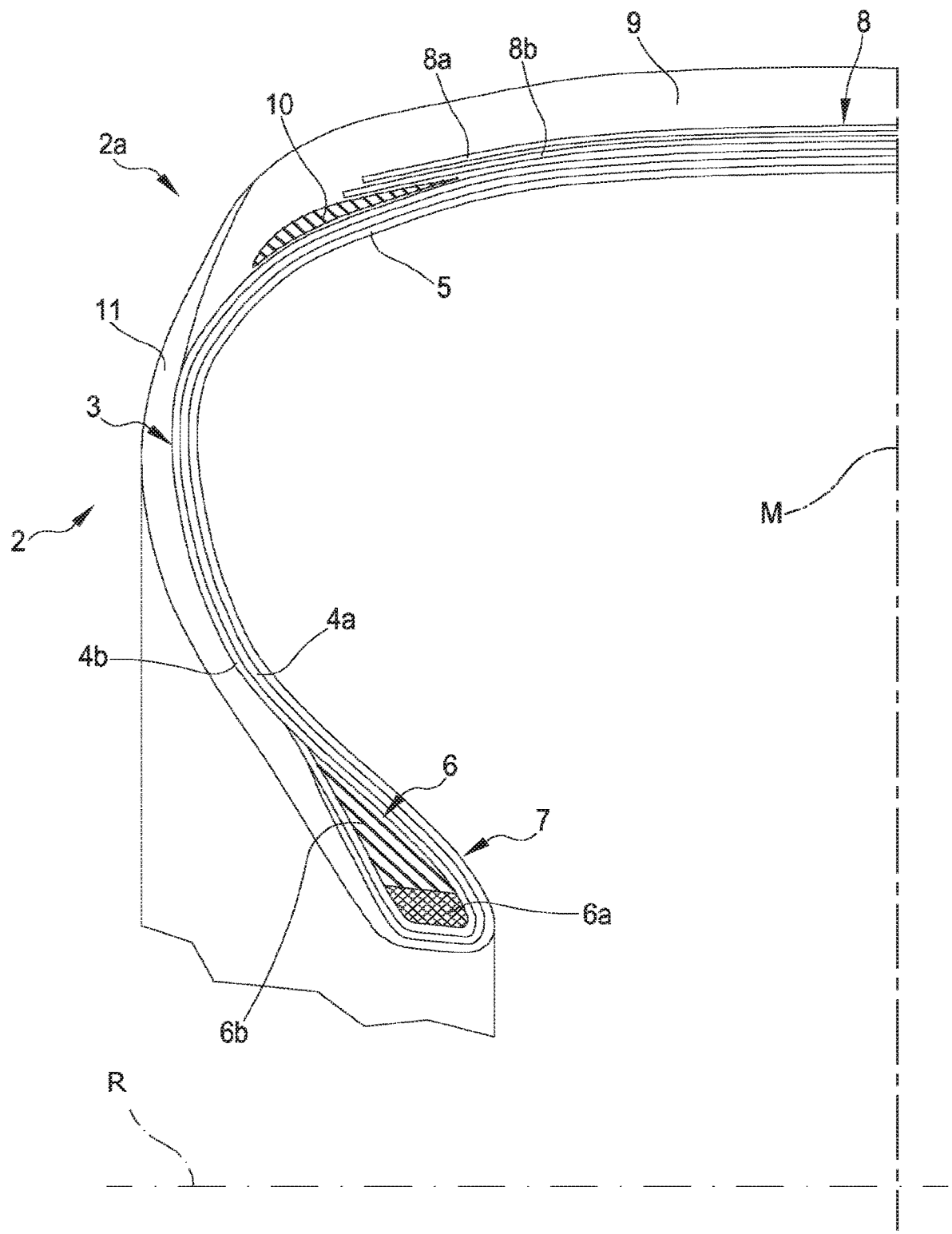
FIG. 2 shows an example of a tyre 2 that can be produced in the plant 1.

The tyre 2 has a middle plane M perpendicular to the axis of rotation R of the tyre 2 (it should be specified that in FIG. 2 the position of the axis of rotation R with respect to the section of the tyre 2 is shown in a totally indicative and schematic manner). The middle plane M divides the tyre 2 into a first axial half 2a and into a second axial half 2b. For the sake of simplicity of illustration, FIG. 2 shows only the first axial half 2a of the tyre 2, the other half 2b being substantially the mirror image (apart from the tread pattern that may not be symmetrical with respect to the aforementioned middle plane M).

The tyre 2 essentially comprises a carcass structure 3 having one or two carcass plies 4a, 4b. A layer of impermeable elastomeric material or so-called liner 5 is applied inside the carcass ply(-ies) 4a, 4b. Two annular anchoring structures 6 (only the axial half of which 2a is shown in FIG. 2) are engaged, in axially opposite positions (with respect to the middle plane M), with respective end edges of the carcass ply(-ies) 4a, 4b. The two annular anchoring structures 6 each comprise a so-called bead core 6a carrying an elastomeric filler 6b in radially outer position. The two annular anchoring structures 6 are integrated close to areas usually identified with the name "beads" 7 (only the axial half of which 2a is shown in FIG. 2), at which the engagement between the tyre 2 and a respective mounting rim usually takes place. A belt structure 8 comprising belt layers 8a, 8b is circumferentially applied about the carcass ply(-ies) 4a, 4b, and a tread band 9 is circumferentially juxtaposed on the belt structure 8. The belt structure 8 can comprise a further layer (not illustrated), known as zero degrees, in a radially outer position with respect to the aforementioned layers 8a, 8b. The belt structure 8 can be associated with so-called "sub-belt inserts" 10 each arranged between the carcass ply(-ies) 4a, 4b and one of the axially opposite end edges of the belt structure 8. Two sidewalls 11, each extending from the corresponding bead 7 to a corresponding side edge of the tread band 9, are applied in axially opposite positions (with respect to the middle plane M) on the carcass ply(-ies) 4a, 4b. The whole of the portion of each sidewall 11 close to the respective side edge of the tread band 9 and of each portion of the tread band 9 close to the respective sidewall 11 is known as shoulder of the tyre.

Figure 1:
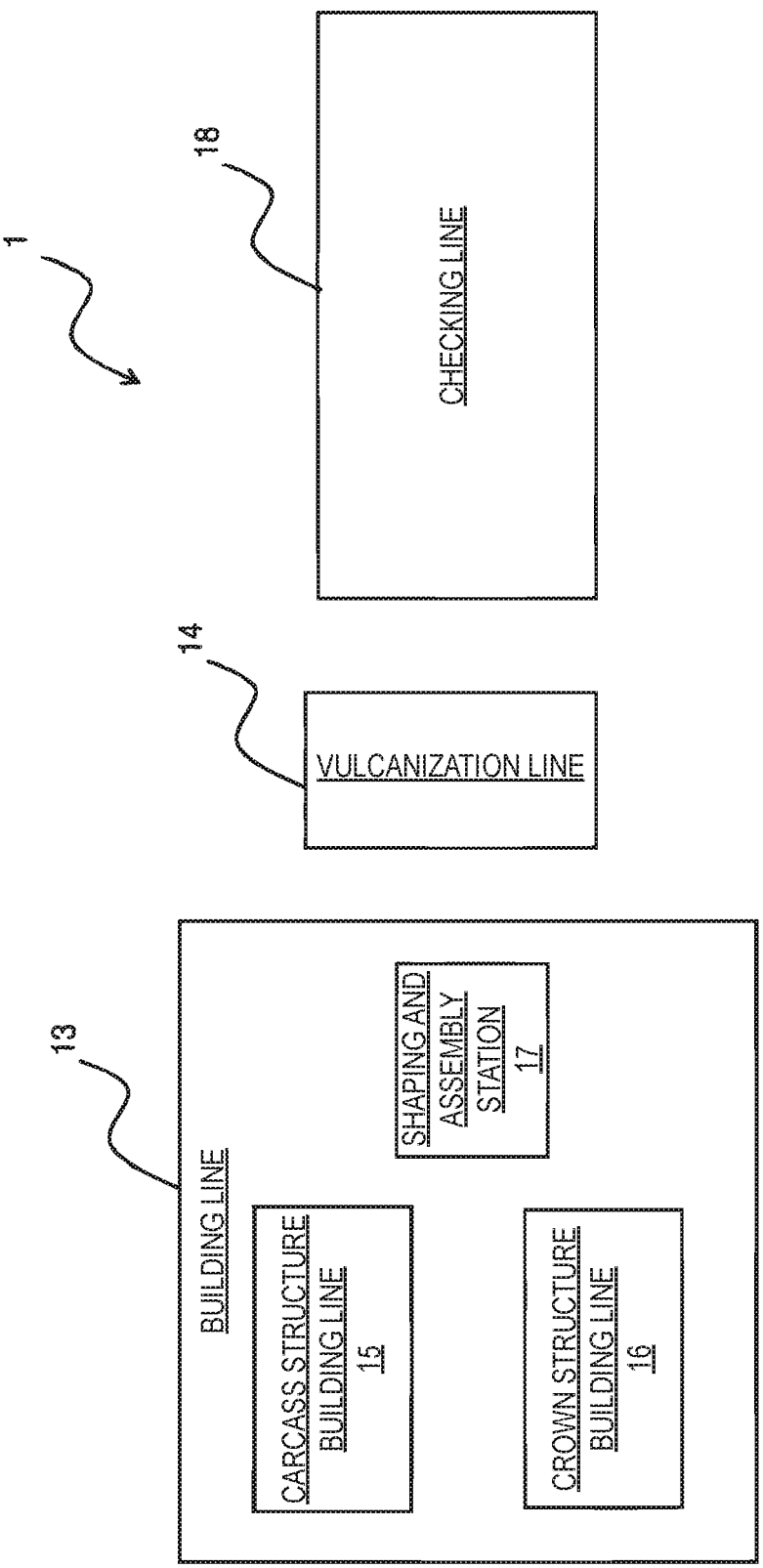
FIG. 1 shows a plant 1 for producing tyres 2 for vehicle wheels.

With particular reference to FIG. 1, the plant 1 comprises a building line 13 of green tyres and a moulding and vulcanization line 14 operatively arranged downstream of the building line 13.

In the non-limiting embodiment of the plant 1 illustrated in FIG. 1, the building line 13 comprises a carcass structure building line 15, a crown structure building line 16 and a shaping and assembly station 17.

In the carcass structure building line 15, forming drums (not illustrated) are moved between different work stations (not illustrated) configured to form, on each forming drum, the carcass structure 3 comprising the carcass ply(-ies) 4a, 4b, the liner 5, the annular anchoring structures 6 and possibly at least a part of the sidewalls 11.

At the same time, in the crown structure building line 16, one or more auxiliary drums (not illustrated) are moved in sequence between different work stations (not illustrated) arranged to form a crown structure on each auxiliary drum, comprising at least the belt structure 8, the tread band 9, and possibly at least a part of the sidewalls 11.

In the shaping and assembly station 17 the carcass structure 3, formed on its own forming drum in the carcass structure building line 15, is shaped and assembled to the crown structure, formed in the crown structure building line 16.

In other embodiments of the plant 1, not illustrated, the building line 13 can be of a different type, for example arranged to form all of the aforementioned components on a single forming drum.

The green tyres manufactured by the building line 13 are transferred to the moulding and vulcanization line 14 comprising one or more vulcanizers.

From the moulding and vulcanization line 14 the finished tyres 2 come out in sequence one after the other with a predetermined frequency and a corresponding predefined production cycle time Tcp.

Downstream of the moulding and vulcanization line 14, the plant 1 comprises a checking line 18 configured to carry out a check of the tyres 2 after moulding and vulcanization.

In addition or alternatively, the plant 1 can comprise a same checking line 18, arranged between the building line 13 and the moulding and vulcanization line 14, configured to carry out a check of the green tyres before the moulding and vulcanization step.

Figure 3A:
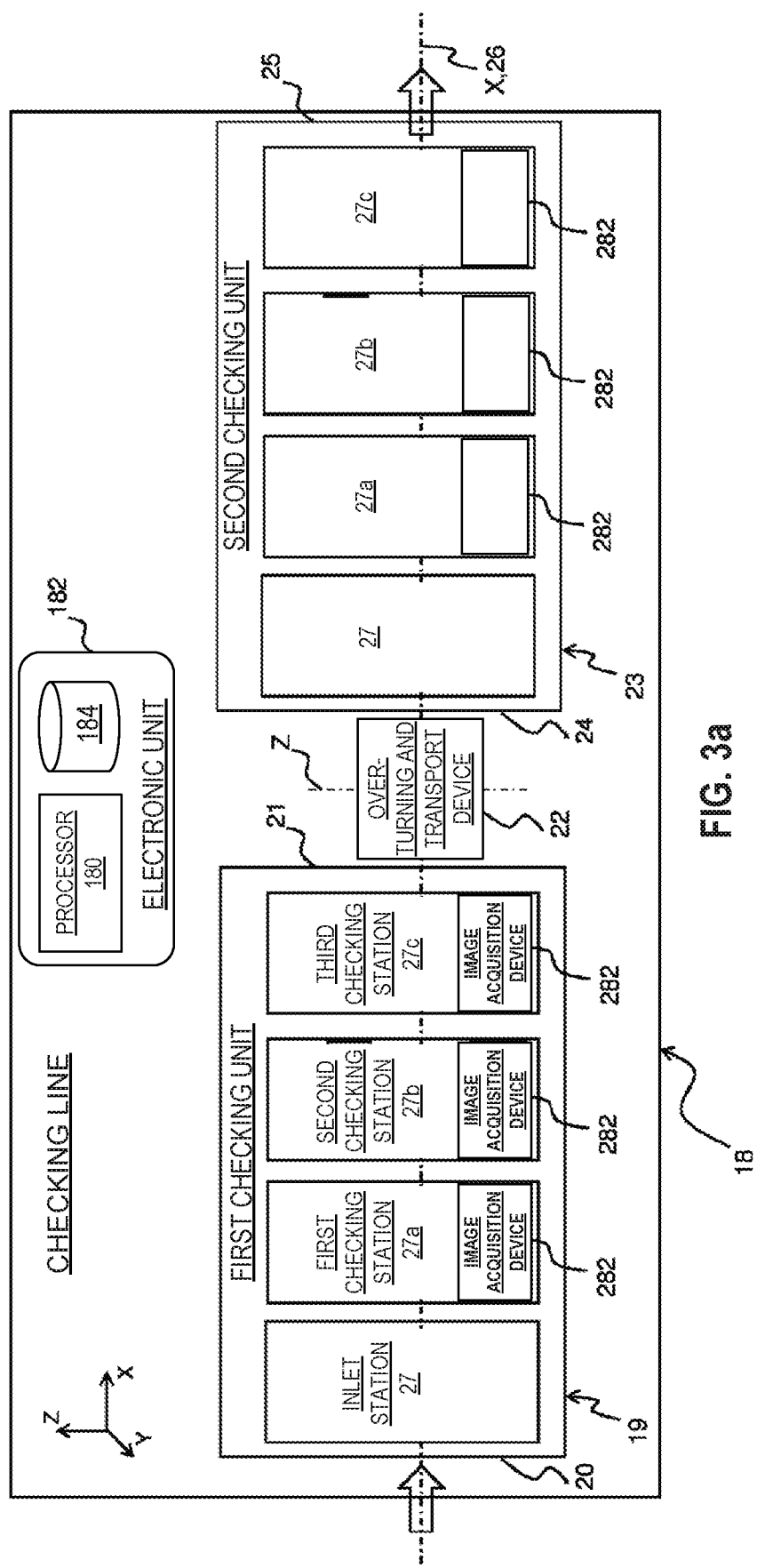

With particular reference to FIG. 3a, the checking line 18 comprises a first checking unit 19 which has an inlet 20 for the finished tyres 2 to be checked that come from the moulding and vulcanization line 14 and a respective outlet 21. Downstream of the first checking unit 19, at the outlet 21 of said first checking unit 19, an overturning and transport device 22 is arranged. Downstream of the overturning and transport device 22 a second checking unit 23 is positioned, which has an inlet 24 for the finished tyres 2 that come from the overturning and transport device 22 and a respective outlet 25. The inlet 20 of the first checking unit 19 constitutes the inlet of the checking line 18. The outlet 25 of the second checking unit 23 constitutes the outlet of the checking line 18. The tyres 2 to be checked enter one after the other in sequence in the inlet 20, follow a checking path 26 in sequence inside the checking line 18 and come out through the outlet 25. In a preferred embodiment, the tyres follow the checking path 26 through a transportation system that implies a simultaneous displacement of all of the tyres 2, carrying out the translation by a fixed pitch, at constant time intervals. Along the checking path 26, which in the embodiment illustrated in FIG. 3a is rectilinear, the tyres 2 are subjected to checks in order to verify the possible presence of defects according to ways that will be described hereinafter.

In a variant embodiment (not illustrated), the first checking unit 19 and the second checking unit 23 are angled to one another to define two rectilinear segments of the checking path 26.

In a further variant embodiment (not illustrated), the first checking unit 19 and the second checking unit 23 are mutually juxtaposed. In particular, the second checking unit 23 can be arranged above (or below) the first checking unit 19 with the overturning and transport device 22 arranged at extreme ends of the first checking unit 19 and of the second checking unit 23. The overturning and transport device 22 is also configured to lift (or lower) the tyres 2 so as to carry them from the first checking unit 19 to the second checking unit 23.

In a further variant embodiment (not illustrated), the checking line 18 comprises a single checking unit 19, 23 (which performs the function of the first and second checking unit 19, 23). In this case, the overturning and transport device 22 and suitable transport devices are adapted for making the tyres 2 travel the same checking station 19, 23 twice, a first time with the first axial half 2a exposed upwards and a second time with the second axial half 2b exposed upwards.

In all of the embodiments described above, the first checking unit 19 and the second checking unit 23 (when present) each comprise an inlet station 27, a first checking station 27a, a second checking station 27b and a third checking station 27c arranged in sequence one after the other along the checking path 26.

The inlet station 27 comprises a support (not illustrated) having a substantially horizontal support area configured to receive and support one of the two sidewalls 11 of the tyre 2 to be checked. The support area defines a conveyor belt configured for transferring the tyres 2 from the inlet station 27 to the first checking station 27a. The conveyor belt defines an advancing direction X during its translation movement.

Each of the quoted checking stations 27a, 27b, 27c comprises a support (not illustrated) for the tyre 2, configured to receive and support one of the two sidewalls 11 of the tyre 2 to be checked, exposing the other sidewall 11 of the tyre 2 upwards.

In a preferred embodiment (not shown), the support of the quoted checking stations 27a, 27b, 27c comprises a table rotating about a vertical axis of rotation Y (perpendicular to the plane of the sheet of FIG. 3a). The rotating table has a substantially horizontal support area configured to receive and support the sidewall 11 of the tyre 2. The rotating table also defines a conveyor belt configured for transferring the tyres 2 from a checking station 27a, 27b, 27c to a subsequent checking station 27b, 27c of the same checking unit 19, 23 or to the overturning and transport device 22 or to the outlet 25. The conveyor belt is folded upon itself to define a closed path and defines the advancing direction X during its own movement that, when the rotating table is stationary in rest position, coincides with the direction of the checking path 26. The conveyor belt has an upper arm that defines said support area of the rotating table.

The overturning and transport device 22 is configured to overturn the tyre about a horizontal overturning axis Z, perpendicular to the advancing direction X and to the vertical direction Y, so as to upwardly expose, in the second checking unit 23, the sidewall 11 of the tyre that in the first checking unit 19 was exposed downwards. In this way, the first checking unit 19 is adapted for operating on the first axial half 2a of the tyre 2 while the second checking unit 23 is adapted for operating on the second axial half 2b of the tyre 2.

The inlet station 27 and the first checking station 27a comprise as a whole first profile-acquisition devices 280 with low resolution.

Figure 4A:
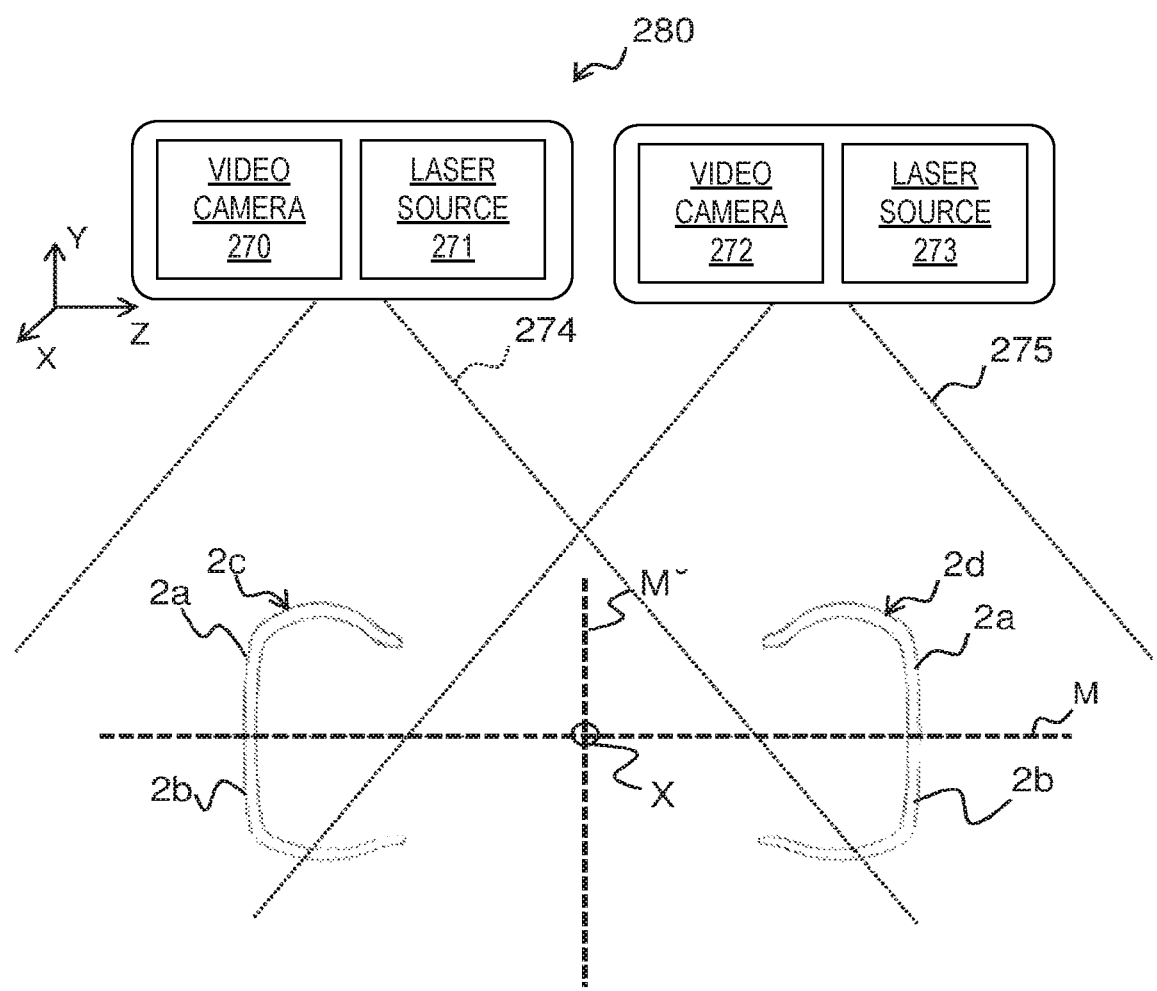

In the embodiment shown in FIG. 4a, the inlet station 27 comprises, as part of the first profile-acquisition devices 280, two video cameras 270, 272 with low resolution associated with two respective laser sources 271, 273. Each laser source 271, 273 is associated with a suitable optic (not shown, for example a suitable cylindrical lens) adapted for transforming the punctiform laser light into a respective slit light 274, 275. The two video cameras 270, 272 with the two respective laser sources 271, 273 are supported by fixed support devices (not illustrated) and are respectively adapted for acquiring images of the radially outer surface of two radial halves 2c, 2d of the tyre 2 while it advances along the advancing direction X (which in FIG. 4 is perpendicular to the plane of the sheet).

The two radial halves 2c, 2d of the tyre 2 are defined by a radial middle plane M' of the tyre containing the axis of rotation R of the tyre.

In particular, the two laser sources 271, 273 are adapted for forming the two slit lights 274, 275 on a plane (which in FIG. 4a corresponds to the plane of the sheet) substantially perpendicular to said advancing direction X so as to each illuminate at least one of the two radial halves 2c, 2d of the tyre 2 that is located on one side or the other with respect to the advancing direction X. Preferably, as shown in FIG. 4a, the two slit lights 274, 275 are each adapted for illuminating one of the two radial halves 2c, 2d of the tyre 2 until at least the lower bead of the other radial half 2d, 2c is illuminated.

Preferably, the two video cameras 270, 272 are two low resolution digital matrix video cameras, adapted for acquiring three-dimensional images.

Figure 3B:
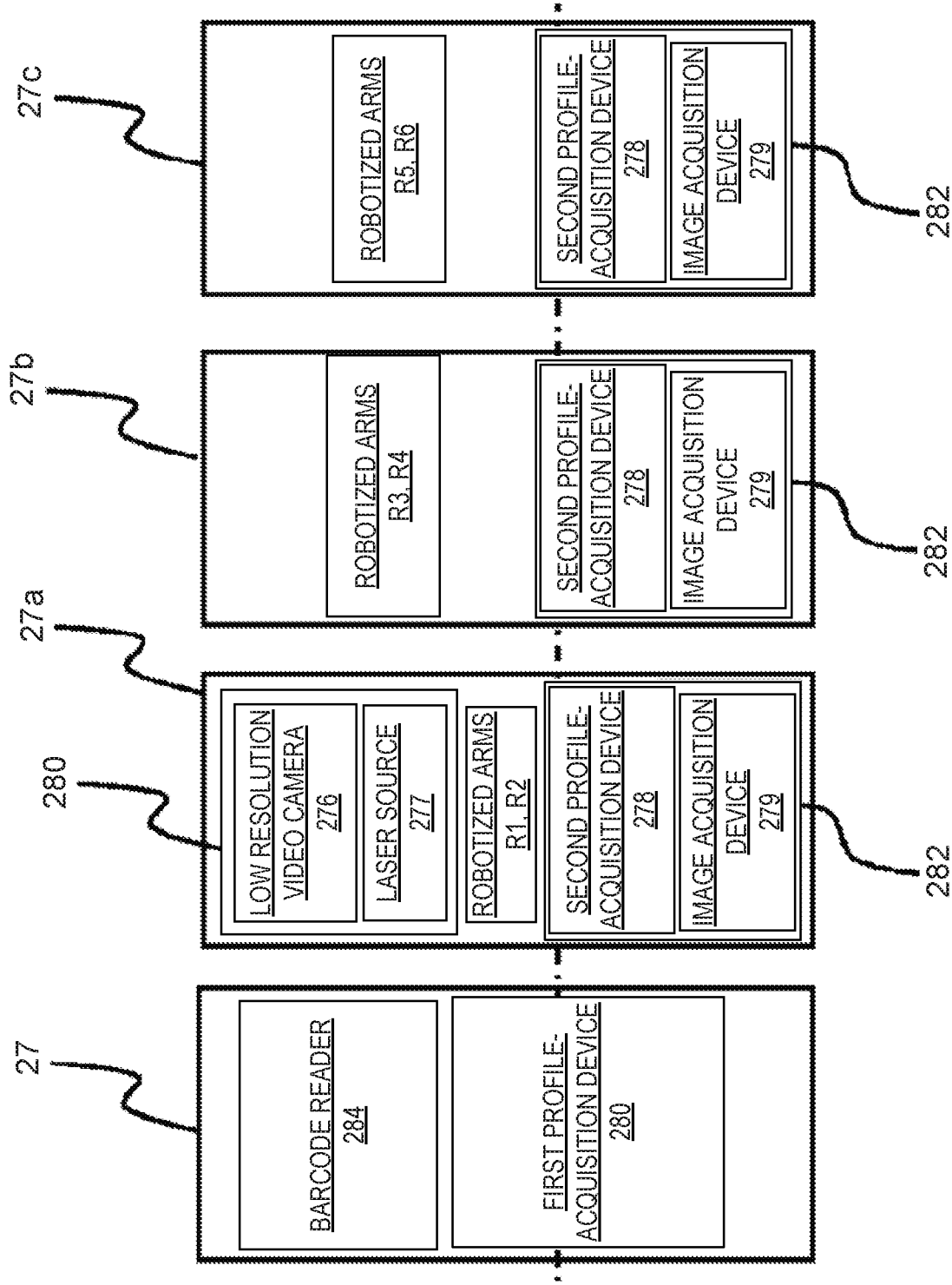
Figure 4B:
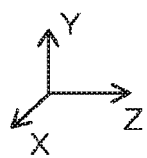
Figure 4B:
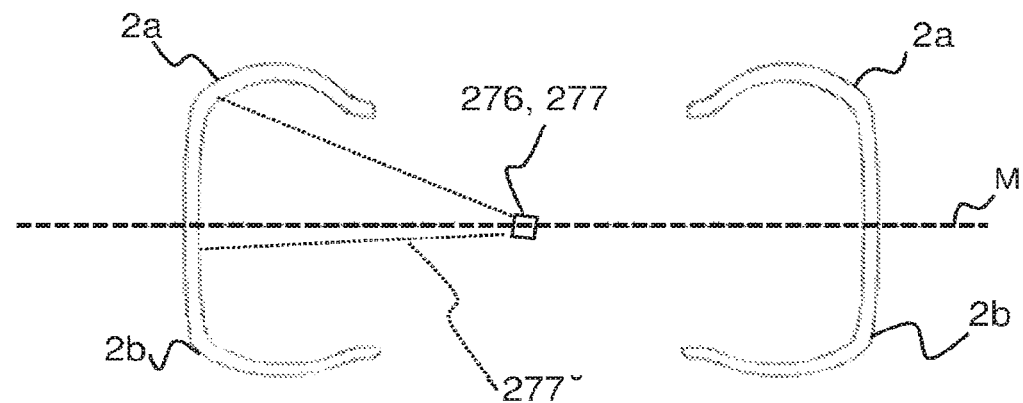

With particular reference to FIGS. 3b and 4b, the first checking station 27a comprises the rest of the first profile-acquisition devices 280, consisting of a low resolution video camera 276 associated with a respective laser source 277. The laser source 277 is associated with a suitable optic (not shown, for example a suitable cylindrical lens) adapted for transforming the punctiform laser light emitted by the laser source 277 into a respective slit light 277' adapted for illuminating, in a radial section plane of the tyre 2, a radially inner surface portion with respect to the tread band 9 of the tyre. The video camera 276 with the respective laser source 277 is supported and moved by an anthropomorphic robotized arm (not illustrated). Preferably, the video camera 276 is a low resolution digital matrix video camera, adapted for acquiring three-dimensional images. The three-dimensional image is obtained thanks to the movement of the tyre 2 that rotates on the rotating table with respect to the video camera 276 and to a suitable algorithm adapted for linking all of the images acquired along the circumference of the tyre.

With reference to FIG. 3b, the first checking station 27a, the second checking station 27b and the third checking station 27c as a whole comprise second profile-acquisition devices 278. The second profile-acquisition devices 278 comprise high resolution video cameras (not illustrated) with respective light sources (preferably lasers) and optics (not illustrated) adapted for forming slit lights (preferably lasers).

The second profile-acquisition devices 278 are supported and moved by a certain number of anthropomorphic robotized arms. For example, the second profile-acquisition devices 278 comprise three video cameras with the respective light sources and optics, supported and moved by three respective anthropomorphic robotized arms R1, R3, R4, one of which (R1) is located in the first checking station 27a and two (R3 and R4) in the second checking station 27b. Preferably, the video cameras of the second profile-acquisition devices 278 are high resolution digital matrix video cameras, adapted for acquiring three-dimensional images. The three-dimensional image is obtained thanks to the movement of the tyre 2 that rotates on the rotating table with respect to the video cameras of the second profile-acquisition devices 278 and to a suitable algorithm adapted for linking all of the images acquired along the circumference of the tyre.

The second profile-acquisition devices 278 can also comprise mirrors (not illustrated) adapted for deviating the light emitted by the laser sources and/or the light reflected by the surface of the tyre.

With reference to FIG. 3b, the first checking station 27a, the second checking station 27b and the third checking station 27c also comprise image acquisition devices 279 comprising high resolution video cameras with respective light sources (preferably of the LED type), optics and mirrors (not illustrated) adapted for illuminating the portions of the tyre 2 shot by the video cameras with diffused and/or grazing light. The image acquisition devices 279 are supported and moved by a certain number of anthropomorphic robotized arms. For example, the image acquisition devices 279 comprise five video cameras, with the respective light sources, optics and mirrors, supported and moved by five respective anthropomorphic robotized arms R1, R2, R3, R5, R6, two of which (R1, R2) are located in the first checking station 27a, one (R3) is located in the second checking station 27b and two (R5, R6) are located in the third checking station 27c. In the quoted example, the anthropomorphic robotized arms R1 and R3 each support and move two video cameras, one of the second profile-acquisition devices 278 and one of the image acquisition devices 279.

Preferably, the video cameras of the image acquisition devices 279 are high resolution digital linear video cameras, adapted for acquiring two-dimensional images. Preferably, said video cameras are adapted for acquiring colour images so that they are linear video cameras with two lines of pixels. The two-dimensional image is obtained thanks to the movement of the tyre 2 that rotates on the rotating table with respect to the video cameras and to a suitable algorithm adapted for linking all of the images acquired along the circumference of the tyre.

The image acquisition devices 279 and the second profile-acquisition devices 278 as a whole constitute a set of image acquisition devices 282 that, as explained in detail hereinafter, is used by the checking line 18 to carry out the checks on the tyres 2 in order to verify the possible presence of defects.

With reference to FIG. 3b, the first checking unit 19 also comprises a barcode reader 284 arranged at the inlet station 27 and configured to read a barcode identifying the tyres 2, arranged on each of said tyres 2.

An analogous barcode reader (not illustrated) can also be arranged at the outlet 25 of the second checking unit 23 for a further identification check.

The checking line 18 is also equipped with an electronic unit 182 for managing the operation of the checking line 18. The electronic unit 182 comprises a processor 180 and a storage 184. The electronic unit 182 is operatively connected to the anthropomorphic robotized arms R1, R2, R3, R4, R5, R6 of the first checking unit 19 and of the second checking unit 23, to the first profile-acquisition devices 280, to the second profile-acquisition devices 278 and to the image acquisition devices 279 (not shown) that allow the rotation of the rotating tables of the checking stations 27a, 27b, 27c, to motors (not shown) that move the conveyor belts of the inlet station 27 and of the checking stations 27a, 27b, 27c, to motors (not shown) of the overturning and transport device 22 and similar.

Said electronic unit 182 can be the same electronic management unit of the entire plant 1 or it can be operatively connected to other units dedicated to other parts of the plant 1.

In the storage 184 a plurality of known models of tyres is stored, with which corresponding checking programs are associated. Each checking program comprises a predetermined setting for the set of image acquisition devices 282. Preferably, in the storage 184, each known model is also associated with a reference image to be used, as explained hereinafter, during the execution of algorithms looking for manufacturing defects that are based on the comparison of an acquired image of the radially outer surface of the tyre 2 with a reference image.

In accordance with the method for checking tyres according to the present invention, whenever a finished tyre 2 comes out from the moulding and vulcanization line 14, it is transferred, for example through a conveyor, to the inlet station 27 of the first checking unit 19. The tyre 2 not mounted on a rim (thus deflated), is rested with one sidewall 11 on the support area of the support of the inlet station 27 with its own second axial half 2b adjacent to such a support area and the first axial half 2a facing upwards.

During the inlet into the inlet station 27, the barcode reader 284 reads the code displayed, for example, on the sidewall 11 of the tyre 2 facing upwards and the data given in it is received by the processor 180 that, for example based on the model of tyre 2, sets the specific checking program.

Figure 8:
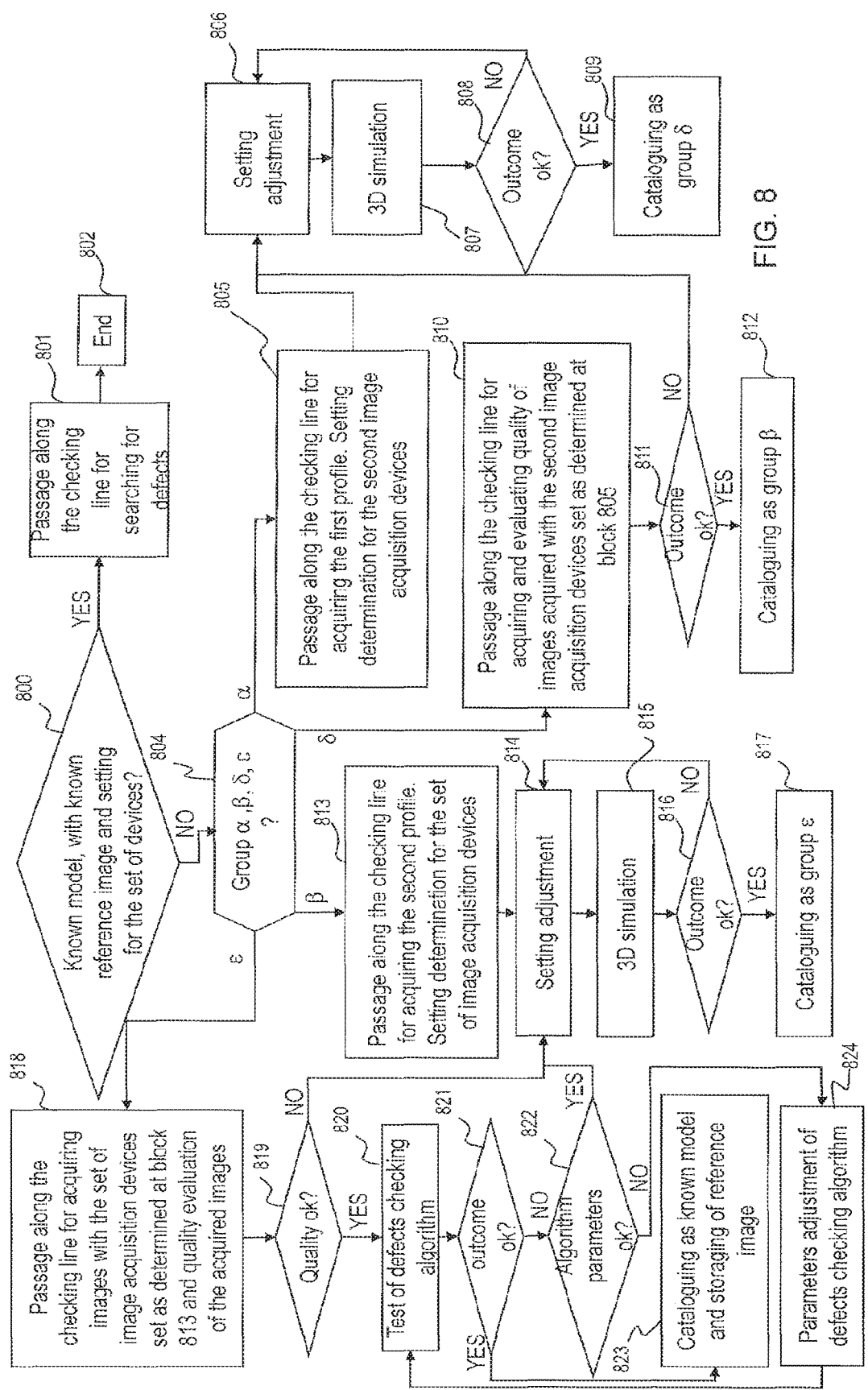

In particular, according to a preferred embodiment of the checking method of the invention and with reference to the algorithm illustrated in FIG. 8, for each tyre 2 in inlet to the checking line 18, the processor 180 determines (block 800) whether the tyre 2 is made according to a known model among the plurality of known models stored in the storage 184.

If the tyre is made according to a known model, the processor 180 sets the specific checking program associated with the known model. As already stated, the checking program comprises, amongst other things, the predetermined setting for the set of image acquisition devices 282, which is associated with each known model of tyre. The processor 180 therefore takes care of inspecting the tyre 2 to search for any manufacturing defects (block 801). In particular, the processor 180 is adapted for acquiring data representative of the surface of the tyre through the set of image acquisition devices 282 set according to the predetermined setting associated with the known model of the tyre and for analysing the data acquired to search for any manufacturing defects. The inspection is carried out by passing the tyre 2 along the checking line 18. In particular, the tyre 2 is passed firstly along the first checking unit 19 where the first axial half 2a of the tyre 2 is inspected, then is overturned by the overturning and transport device 22, and then is passed along the second checking unit 23 where the second axial half 2b of the tyre 2 is inspected. In the inlet station 27, while the tyre 2 advances along the advancing direction X, the video cameras 270 and 272 acquire low resolution images that are analysed by the processor 180 to carry out a first preliminary check of the tyre 2, adapted for highlighting, for example, macro-defects and for immediately recognising possible deformed tyres to be immediately discarded without proceeding further in the checking procedures.

In each of the checking stations 27a, 27b, 27c, a centring operation is firstly carried out that is adapted for making the axis of rotation R of the tyre 2 correspond with the vertical axis of rotation Y of the rotating table. Thereafter, the robotized arms R1, R2, R3, R4, R5 and/or R6 of the checking station 27a, 27b or 27c are moved so as to position the set of image acquisition devices 282 in positions defined by the predetermined setting associated with the known model of the tyre. Said predetermined setting defines, for each position, a set of coordinates of the reference system used in each checking station 27a, 27b, 27c. In general, the predetermined setting defines a certain number of positions (for example four) for each image-acquisition device (in particular, for each video camera) that, as will be explained more clearly hereinafter, are predefined so as to acquire images of a predetermined surface portion of tyre. For each position defined by the predetermined setting, the robotized arms R1, R2, R3, R4, R5 and/or R6 are suitably positioned and, keeping the respective devices of the set of image acquisition devices 282 stationary, the tyre 2 is rotated by means of the rotating table about its axis of rotation R with a predetermined peripheral speed until it is made to perform a rotation by a rotation angle of at least 360°.

During every rotation, different portions of the radially outer or inner surface of the tyre 2 are illuminated and slide in front of the video cameras that acquire the sequence of images received. During each rotation, which constitutes a checking cycle, the processor 180 carries out predetermined checking procedures, according to the specific checking program. As already stated, every known model is preferably associated with a reference image that is used during the execution of the algorithms looking for manufacturing defects that are based on the comparison of an acquired image of the radially outer surface of the tyre 2 with the reference image.

Once the last checking cycle in the checking station 27a, 27b or 27c has ended, the robotized arms R1, R2, R3, R4, R5, R6 are taken away from the tyre 2 and the tyre 2 is transferred to the next checking station 27b, 27c or to the overturning and transport device 22 or to the outlet 25 of the checking line 18. When the tyre 2 is transferred to the outlet 25 of the checking line 18, the algorithm ends its execution at block 802.

The aforementioned operations, adapted for inspecting as a whole (during the passage along the checking line 18 at block 801) the tyre 2 to search for any manufacturing defects, are carried out in a checking cycle time Tcc that indicates the time that passes between the outlet of a tyre checked by the checking line 18 and the outlet of the next tyre.

If at block 800 the processor 180 determines that the tyre 2 is made according to an unknown model, the processor 180 determines (block 804) whether the tyre 2 belongs to one of four predefined groups α, β, δ and ε.

If at block 804 the processor 180 determines that the tyre 2 belongs to group α (which is relative to tyres made according to an unknown model such that the checking line 18 has not yet carried out any check), at block 805 the tyre 2 is submitted to a passage along the checking line 18 for the acquisition of a first profile 300 of the tyre 2 through the first profile-acquisition devices 280. In particular, in the inlet station 27 of the first checking unit 19 and of the second checking unit 23, while the tyre 2 advances along the advancing direction X, the video cameras 270 and 272 acquire low resolution three-dimensional images of the radially outer surface of the tyre 2 of the first axial half 2a (or of the second axial half 2b), as schematically illustrated in FIG. 4a. From such images, the processor 180 is adapted for determining, on a radial section plane that contains the axis of rotation R of the tyre 2, the profile 301 of the radially outer surface of the first axial half 2a (or of the second axial half 2b) of the tyre 2, as schematically illustrated in FIG. 5a.

In turn, in the first checking station 27a of the first checking unit 19 and of the second checking unit 23, after having carried out a centring operation as described above, through the respective robotized arm, the video camera 276 is positioned in a predetermined position, independent from the profile of the tyre 2, for example in a position substantially corresponding to the centre of the tyre at a predetermined height along the vertical axis of rotation Y of the rotating table. From such a position, the video camera 276 frames, as schematically illustrated in FIG. 4b, a surface portion substantially corresponding to the portion of liner 5 radially inside and opposite the tread band 9 of at least the first axial half 2a (or second axial half 2b) of the tyre 2. After this, the tyre 2 is rotated about its axis of rotation R so as to obtain three-dimensional images given by the linking of images of such a portion acquired by the video camera 276 during the rotation of the tyre 2. From such images, the processor 180 is adapted for determining, on a radial section plane that contains the axis of rotation R of the tyre 2, the profile 302 of said surface portion substantially corresponding to the portion of liner 5 radially inside and opposite the tread band 9 of at least the first axial half 2a (or second axial half 2b) of the tyre 2, as schematically illustrated in FIG. 5b.

The tyre is then passed along the successive checking stations 27b and 27c, without carrying out any check.

Figure 5C:
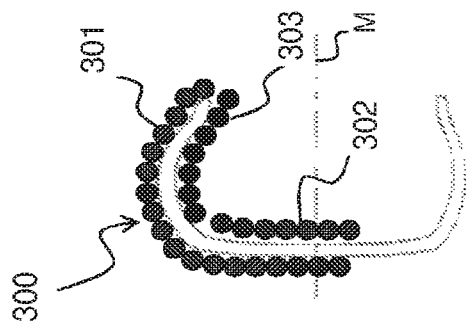
Figure 5B:
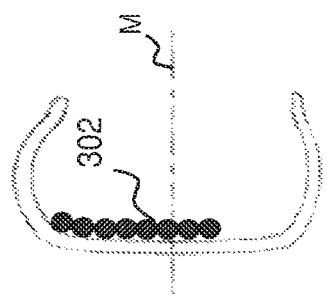
Figure 5A:
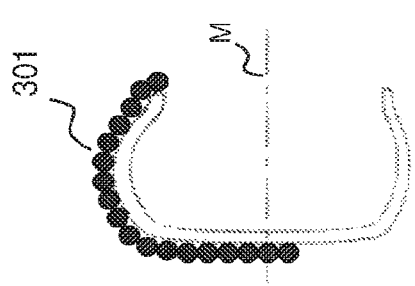

Once the tyre 2 has come out from the checking line 18, again at block 805, the processor 180 is adapted for calculating off-line (in other words outside of the checking line 18), on said radial section plane, the first low resolution profile 300 of the radially outer and inner surface of the tyre 2 determining and linking, for the first axial half 2a and for the second axial half 2b of the tyre 2, the aforementioned profiles 301, 302 and a profile 303 (as schematically illustrated in FIG. 5c as far as the first axial half 2a or the second axial half 2b is concerned). Such a profile 303 is relative to a radially inner surface portion that is located substantially at the sidewall 11 and bead 7 of the first axial half 2a (or of the second axial half 2b of the tyre 2) and can be obtained by extrapolation from the profiles 301 and 302 (for example considering a predetermined offset with respect to the profile 301). The first low resolution profile 300 of the radially outer and inner surface of the tyre 2 is thus obtained. After this, as described hereinafter with reference to FIG. 7, the processor 180 determines off-line the setting for the second profile-acquisition devices 278 based on the first profile 300 thus acquired.

Once the setting for the second profile-acquisition devices 278 has been determined, at block 806 it is foreseen for an operator to intervene to carry out checks (for example through a suitable graphical simulation interface) on the setting determined and, if necessary, to carry out the suitable adjustments.

After this, at block 807 it is provided to carry out a 3D simulation of the operation of the second profile-acquisition devices 278 set according to the setting determined at block 805. At block 808 the outcome of the 3D simulations carried out is checked. In the case of detection of improper manoeuvres that could damage the second profile-acquisition devices 278, in particular those possibly adapted for operating simultaneously inside or outside the tyre, it is provided to return to block 806. Otherwise, if the 3D simulation has a positive outcome, at block 809 the tyre is catalogued as group δ. In this way, when the tyre 2 in question goes back to the checking line 18, according to ways and times that can be defined as a function of the requirements of the entire checking system of the production plant 1, it will be recognised at blocks 800 and 804 as a tyre 2 of unknown model of group δ, with the associated setting for the second profile-acquisition devices 278 as determined at block 805.

It should be observed that the second profile-acquisition devices 278 are less in number with respect to the set of image acquisition devices 282. Moreover, as in the case of the embodiment considered, they could be configured so as not to operate simultaneously in close positions inside or outside of the tyre 2. In an alternative embodiment, the 3D simulation step carried out at block 807 and the check at block 808 could therefore be omitted so that the algorithm would pass directly from block 806 to block 809.

If at block 804 the processor 180 determines that the tyre 2 belongs to group δ, at block 810 it is provided to submit the tyre 2 to a passage along the checking line 18 in order to evaluate (for example through an operator) the quality of the images acquired with the second profile-acquisition devices 278 set as determined at block 805. At block 811 the outcome of the evaluations carried out is checked. If the check has a negative outcome, it is provided to return to block 806. If the check has a positive outcome, at block 812 the tyre 2 is catalogued as group β, associating with it in storage 184 the setting determined at block 805 for the second profile-acquisition devices 278. In this way, when the tyre 2 in question goes back to the checking line 18, according to ways and times that can be defined as a function of the requirements of the entire checking system of the production plant 1, it will be recognised at blocks 800 and 804 as a tyre 2 of unknown model of group β, with the associated setting for the second profile-acquisition devices 278 as determined at block 805.

If at block 804 the processor 180 determines that the tyre 2 belongs to group β, which is relative to tyres made according to an unknown model such that the checking line 18 has already acquired the first profile 300, at block 813 the tyre 2 is submitted to a check turn along the checking line 18 for the acquisition of a second profile 400 of the tyre 2 through the second profile-acquisition devices 278 set according to the setting determined at block 805 based on the first profile 300.

In particular, the tyre is passed into the inlet station 27 and into the third checking station 27c without carrying out any checks.

Figure 6D:
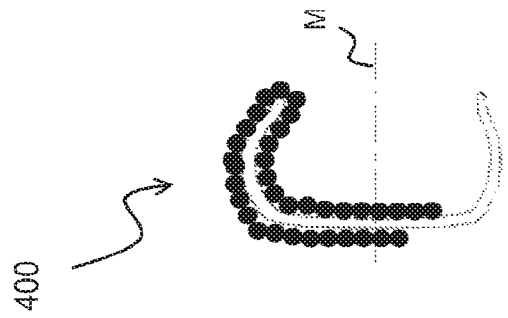

Moreover, in the first checking station 27a of the first checking unit 19 and of the second checking unit 23, after having carried out a centring operation as described above, the video camera of the second profile-acquisition devices 278 is positioned, according to the setting previously determined at block 805, in a certain number of positions (for example four) in which the video camera frames, as a whole, a surface portion substantially corresponding to the portion of liner 5 radially inside and opposite the tread band 9 of at least the first axial half 2a (or second axial half 2b) of the tyre 2. Thereafter, the aforementioned video camera is positioned in a certain number of positions (for example four) in which it frames, as a whole, a radially outer surface portion substantially corresponding to a part of sidewall 11 close to the tread band 9. For each of said positions of the video camera, the tyre 2 is made to rotate about its axis of rotation R so as to obtain three-dimensional images given by the linking of images of such surface portions acquired by the video camera during the rotation of the tyre 2. From such images, the processor 180 is adapted for determining, on a radial section plane that contains the axis of rotation R of the tyre 2, the profiles 401 and 402, as schematically illustrated in FIG. 6a.

Figure 6C:
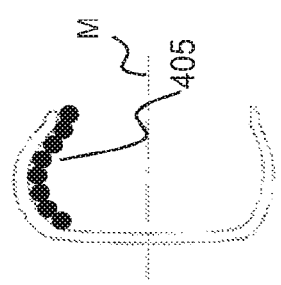
Figure 6B:
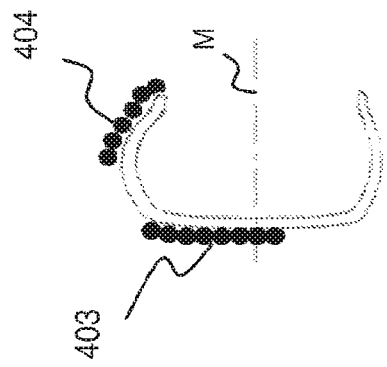
Figure 6A:
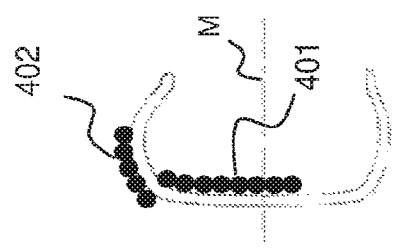

Moreover, with particular reference to FIGS. 6b and 6c, in the second checking station 27b of the first checking unit 19 and of the second checking unit 23, after having carried out a centring operation as described above, the two video cameras of the second profile-acquisition devices 278 are positioned, through the respective robotized arms and according to the setting previously determined based on the first profile 300, each in a certain number of positions so as to acquire as a whole, during successive rotations of the tyre, three-dimensional images of an inner surface portion substantially corresponding to the portion of liner 5 opposite the sidewall 11 and the bead 7, a radially outer surface portion substantially corresponding to the bead 7 and to a part of the sidewall 11 close to the bead 7, and a radially outer surface portion substantially corresponding to the tread band 9 of at least the first axial half 2a (or second axial half 2b) of the tyre 2.

For each of said positions of the video cameras, the tyre 2 is made to rotate about its own axis of rotation R so as to acquire three-dimensional images of the aforementioned surface portions. From such images, the processor 180 is adapted for determining, on a radial section plane that contains the axis of rotation R of the tyre 2, the profiles 403, 404 and 405, as schematically illustrated in FIGS. 6b and 6c.

As schematically illustrated in FIG. 6d, once the tyre 2 has come out from the checking line 18, the processor 180 is adapted for calculating off-line (in other words outside of the checking line 18), on said radial section plane, the second high resolution profile 400 of the radially outer and inner surface of the tyre 2 of the first axial half 2a and of the second axial half 2b of the tyre 2 determining and linking the aforementioned profiles 401, 402, 403, 404 and 405. After this, as described hereinafter with reference to FIG. 7, again at block 813, the processor 180 is adapted for determining off-line the setting for the set of image acquisition devices 282 based on the second profile 400 thus calculated.

In the illustrated embodiment, once the setting is determined for the set of image acquisition devices 282, at block 814 it is foreseen for an operator to intervene to carry out checks (for example through a suitable graphical simulation interface) on the setting determined and, if necessary, to carry out the suitable adjustments. After this, at block 815 it is provided to carry out a 3D simulation of the operation of the set of image acquisition devices 282 set according to the setting determined at block 813. At block 816 the outcome of the 3D simulations carried out is checked.

In the case of detection of improper manoeuvres that could damage the set of image acquisition devices 282, in particular those adapted for operating simultaneously inside or outside the tyre, it is provided to return to block 814. Otherwise, if the 3D simulation has a positive outcome, at block 817 the tyre 2 is catalogued as group ε. In this way, when the tyre 2 in question goes back to the checking line 18, according to ways and times that can be defined as a function of the requirements of the entire checking system of the production plant 1, it will be recognised at blocks 800 and 804 as a tyre 2 of unknown model of group ε, with the associated setting for the set of image acquisition devices 282 as determined at block 813.

If at block 804 the processor 180 determines that the tyre 2 belongs to group ε, at block 818 it is provided to submit the tyre 2 to a passage along the checking line 18 in order to evaluate (for example through an operator) the quality of the images acquired with the set of image acquisition devices 282 set as determined at block 813. At block 819 the outcome of the evaluations carried out is checked. If the check has a negative outcome, it is provided to return to block 814 to carry out the necessary adjustments to the setting. If the check has a positive outcome, at block 820 it is provided to execute an algorithm to search for any manufacturing defects that is based on the comparison of the image acquired of the radially outer surface of the tyre with a reference image (which in this case, since there is not yet a reference image for the unknown model, corresponds to the same image acquired). This advantageously makes it possible to test such an algorithm and verify whether it is necessary to carry out any adjustments.

At block 821 the outcome of the algorithm is checked. If the check has a positive outcome, at block 823 the model of the tyre 2 is added as a known model to the plurality of known models in the storage 184, with the associated setting determined at block 813 for the set of image acquisition devices 282 and the image acquired at block 818, relative to the radially outer surface of the tyre, serving as reference image for such a specific known model. In this way, when the tyre 2 in question goes back to the checking line 18, according to ways and times that can be defined as a function of the requirements of the entire checking system of the production plant 1, it will be recognised at block 800 as a tyre 2 of known model with the associated setting for the set of image acquisition devices 282 and the reference image.

If the check at block 821 has a negative outcome, at block 822 it is provided to check whether predetermined internal parameters of the algorithm are adequate and/or correctly set. In the negative case, at block 824 it is provided to make the necessary modifications to the algorithm and to return to block 820. If, on the other hand, the check at block 822 has a positive outcome, it can mean that the quality check at block 819 (for example carried out through visual checking by an operator) has given a false positive. Therefore, it is provided to go back to block 814.

In an embodiment (not illustrated), in the checking method of the invention it is possible to provide a procedure adapted for automatically managing, in the checking line 18, the arrival of tyres of known model but of unknown mould (for example because in the moulding and vulcanization line 14 the moulds have been changed). For example, it is possible to provide, between the block 801 and the block 802, a check adapted for discovering whether during the circuit in the checking line 18 carried out at block 801 there have been anomalies due to the presence of a tyre 2 of known model, but moulded with an unknown mould. Such a check can be carried out considering that if the tyre 2 of known model has been moulded and vulcanized with an unknown mould, the check carried out at block 801 will have anomalies due to the fact that the reference image used in the checking algorithms is not suitable, since it is taken for a tyre moulded and vulcanized with a different known mould. In the presence of anomalies, it is therefore possible to provide to submit the tyre 2 to a further passage along the checking line 18 for the sole purpose of acquiring an image of the radially outer surface of the tyre 2 through the set of image acquisition devices 282 set according to the predetermined setting associated with the known model, in order to associate a suitable reference image with the model of tyre with the mould in question.

In a preferred embodiment of the invention, at blocks 805 and 813, determining the setting of the second profile-acquisition devices 278 and of the set of image acquisition devices 282 is carried out through a procedure that makes it possible to simulate which are the portions of the first/second profile 300, 400 that are framed in the field of view and in the field of depth of each video camera as a function of the movement of the respective robotized arm.

In particular, as stated above, the predetermined setting defines a certain number of positions (for example four) for each image-acquisition device (in particular, for each video camera). Every position makes it possible to acquire images of a sub-portion of a predetermined surface portion of tyre. For each of such positions, it is provided to simulate which are the sub-portions of the first/second profile 300, 400 that are framed in the field of view and in the depth of field of the video camera by moving the respective robotized arm until the coordinates of the position that allows the video camera to frame the sub-portion of interest without interfering with the first/second profile acquired and/or with other devices of the checking station, are identified.

Preferably, the simulations are carried out with the help of a suitable graphical interface that makes it possible to visualise in 2D, on a radial section plane of the tyre, the first/second profile acquired 300, 400, the robotized arm with the video camera and the sub-portions of the first/second profile 300, 400 that are framed in the field of view and in the depth of field of the video camera by moving the robotized arm.

Figure 7:
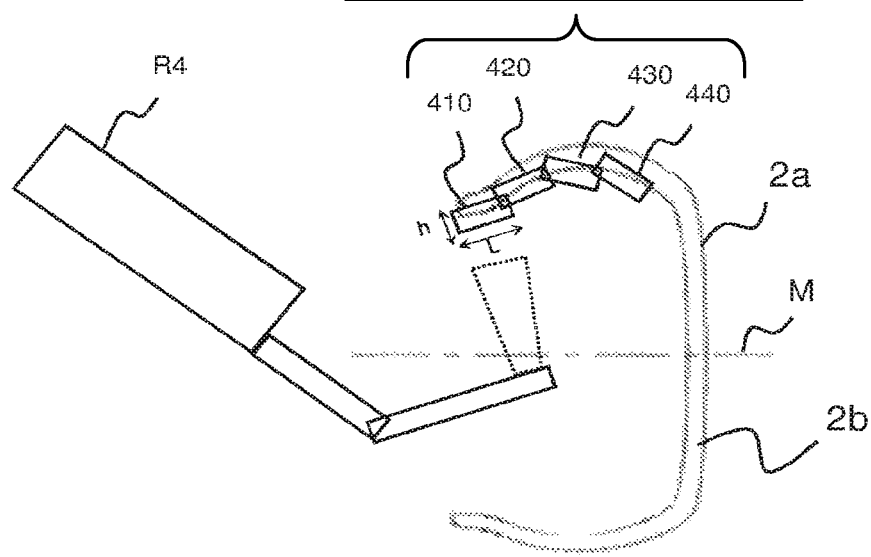

FIG. 7 schematically shows an example of the result that can be obtained with such simulations, when carried out to define four positions of the video camera arranged to acquire images of the profile 405 of the inner surface portion of the tyre 2 substantially corresponding to the portion of liner 5 opposite the sidewall 11 and the bead 7. In particular, in FIG. 7, the rectangles 410, 420, 430 and 440 graphically represent the area framed by the video camera in the four positions. In particular, the height h of the rectangles 410, 420, 430 and 440 represents the depth of field of the video camera supported by the robotized arm R4 whereas the width L represents the width of the field of view of the video camera that it is considered suitable to use with respect to the theoretical field of view.

As a result of the aforementioned simulations, the four rectangles 410, 420, 430 and 440 are arranged so as to cover four surface sub-portions that, at a whole, make it possible to cover the entire portion 405 without discontinuity, the whole thing avoiding collisions of the video camera (including light source and associated optics) and of the respective robotized arm R4 against the tyre and/or other devices of the checking station. Preferably, in order to avoid such discontinuities, the rectangles 410, 420, 430 and 440 are in part juxtaposed over the adjacent rectangles.

It should be observed that the aforementioned simulations make it possible to identify the positions of the image acquisition devices in a two-dimensional reference system of such image acquisition devices (in particular of the video cameras). Therefore, it is provided to carry out a suitable calibration procedure that makes it possible to characterise the geometry of the reference system of the video cameras and to map the 2D coordinates identified in such a reference system in a set of coordinates of a reference system used in the work stations 27*a*, 27*b*, 27*c*.

Preferably, no matter whether it concerns the passage along the checking line 18 relative to any one of blocks 801, 805, 810, 813 or 818, the duration of each checking passage is equal to the aforementioned checking cycle time Tcc. Preferably, the checking cycle time Tcc is equal to the production cycle time Tcp or to a multiple thereof. Moreover, determining the setting of the second profile-acquisition devices 278 and of the set of image acquisition devices 282 and the operations at blocks 806-809; 811-812; 814-

817; 819-824 are carried out off-line, without impacting upon the checking cycle time Tcc. All of this makes it possible to implement the procedure to determine the setting of the set of image acquisition devices 282 relative to unknown models of tyres (carried out as a whole at blocks 804-824 of FIG. 8) with times compatible with the production cycle time Tcp.

In particular, the invention makes it possible to manage the arrival of an unknown model of a tyre in the checking line 18 in a flexible and automatic manner, avoiding the checking line 18 having to be stopped to be adapted to manage the tyre of unknown model. According to the invention, this is done by using the checking line 18 itself to automatically and precisely determine the setting of the set of image acquisition devices 282 through successive passages that make it possible to obtain an increasing precision protecting the integrity of the devices. In particular, in the absence of precise information on the profile of the tyre, the use of the first profile-acquisition devices 280 arranged according to predetermined positions, which are safe for any model of tyre, makes it possible to obtain a first profile that is approximate but in any case indicative of the surface of the tyre. After this, with the first approximate profile it is possible to determine the setting for the second profile-acquisition devices 278 in a precise manner, taking into account the specificities of the profile of the tyre model (in other words more or less rounded sidewalls, more or less high sidewall height and/or section width, and similar), ensuring, on the one hand, the integrity of the devices and, on the other hand, the obtaining of a second accurate profile. The latter finally makes it possible to further refine the definitive setting of the set of image acquisition devices 282 of the checking line 18 in order to further improve the quality of the images acquired during successive checks, always protecting the integrity of the acquisition devices.

Thanks to the invention it is therefore possible to make an industrial-scale automated system for checking tyres produced in any production plant, including plants that produce a large number of models of tyre, even ones that are very different from each other, at the same time meeting the requirements of accuracy of the checks, compatibility with the building/production cycle time, flexibility and specificity of the entire checking system with regard to every model of tyre.

The invention claimed is:

1. A method for checking a tyre for vehicle wheels of an unknown model, the method, in succession, comprising:
   acquiring, by a processor, a first profile of the tyre with one or more first profile-acquisition devices arranged in a predetermined position to generate a first part of the first profile, wherein acquiring the first profile comprises acquiring the first part of the first profile;
   determining a setting for one or more second profile-acquisition devices based on the first profile acquired by the processor, wherein the setting comprises coordinates for each device to identify at least one position allowing for the acquisition of a portion of the first profile, without interfering with the first profile;
   acquiring, by the processor, a second profile of the tyre using the second profile-acquisition devices according to the setting for the second profile-acquisition devices;
   determining a setting for a set of image acquisition devices based on the second profile acquired by the processor; and
   cataloguing, in a storage with a plurality of known models, a specific checking program of the setting for the set of image acquisition devices for the unknown model, wherein the unknown model is changed into a known model in the storage.

2. The method according to claim 1, wherein the first part of the first profile is acquired at low resolution.

3. The method according to claim 1, wherein the second profile is acquired at high resolution.

4. The method according to claim 1, wherein determining the setting for the set of image acquisition devices comprises determining coordinates for each device to identify at least one position allowing for the acquisition of a portion of the second profile, without interfering with the second profile.

5. The method according to claim 4, wherein for each of the set of image acquisition devices, through simulations, coordinates are determined, wherein the simulations allow the set of image acquisition devices to acquire the portion of the second profile without interfering with the second profile.

6. The method according to claim 1, wherein for each of the second profile-acquisition devices, through simulations, coordinates are determined, wherein simulations allow the second profile-acquisition devices to acquire the portion of the first profile without interfering with the first profile.

7. The method according to claim 1, further comprising, after the unknown model is catalogued, inspecting the tyre for one or more manufacturing defects by acquiring data on a part of a surface of the tyre through the set of image acquisition devices set according to the specific checking program for the unknown model.

8. The method according to claim 7, wherein inspecting the tyre for the one or more manufacturing defects is carried out in a checking cycle time (Tcc) as the tyre moves along a checking path.

9. The method according to claim 8, wherein acquiring the first part of the first profile of the tyre is carried out in the checking cycle time (Tcc) as the tyre moves along the checking path and wherein acquiring the second profile of the tyre is carried out in the checking cycle time (Tcc) during a further passage of the tyre along the checking path.

10. The method according to claim 1, wherein after determining the setting for the set of image acquisition devices based on the second profile acquired by the processor, acquiring a surface image of the tyre through the set of image acquisition devices based on the setting for the set of image acquisition devices, wherein the surface image is associated in the storage with the specific checking program for the unknown model.

11. The method according to claim 1, wherein acquiring the first profile of the tyre further comprises acquiring a second part of the first profile through an extrapolation from the first part of the first profile.

12. The method according to claim 11, wherein the second part of the first profile is a radially inner surface portion of the tyre.

13. The method according to claim 12, wherein the radially inner surface portion of the tyre comprises one or more sidewalls and one or more beads of the tyre.

14. The method according to claim 1, wherein acquiring the first part of first profile of the tyre comprises acquiring images of a radially outer surface portion of the tyre through the first profile-acquisition devices.

15. The method according to claim 1, wherein acquiring the first part of the first profile of the tyre comprises acquiring images of a radially inner surface portion of the tyre through the first profile-acquisition devices.

16. The method according to claim 1, wherein acquiring the second profile of the tyre comprises acquiring images of a radially outer surface portion of the tyre through the second profile-acquisition devices.

17. The method according to claim 1, wherein acquiring the second profile of the tyre comprises acquiring images of a radially inner surface portion of the tyre through the second profile-acquisition devices.

18. The method according to claim 1, wherein at least one of the acquisition of the first part of the first profile of the tyre and the acquisition of the second profile of the tyre comprises: acquiring images of a first axial half of the tyre; overturning the tyre about an overturning axis; and acquiring images of a second axial half of the tyre.

19. The method according to claim 1, wherein acquiring the second profile comprises acquiring one or more surface images of the tyre by rotating the tyre about an axis of rotation with respect to the second profile-acquisition devices which remain stationary according to the setting of the second profile-acquisition devices.

20. The method according to claim 1, wherein acquiring the first part of the first profile comprises acquiring images of at least a radially inner surface portion of the tyre by rotating the tyre about an axis of rotation with respect to a first part of the first profile-acquisition devices which remain stationary with respect to the predetermined positions to generate the first part of the first profile.

21. The method according to claim 1, wherein acquiring the first part of the first profile comprises acquiring images of a part of a radially outer surface of the tyre by translating the tyre along an advancing direction perpendicular to an axis of rotation of the tyre, with respect to a second part of the first profile-acquisition devices which remain stationary in the predetermined positions and wherein acquiring the first part of the first profile comprises forming two slit lights on a plane substantially perpendicular to the advancing direction to illuminate as a whole the part of the radially outer surface of the tyre translating along the advancing direction.

22. A checking line of a tyre for vehicle wheels comprising:
 a plurality of checking stations comprising:
  one or more first profile-acquisition devices arranged according to fixed positions to acquire images, and configured to acquire at least a first part of a first profile of the tyre,
  one or more second profile-acquisition devices configured to acquire images according to a predefined setting based on the first profile of the tyre to acquire a second profile of the tyre,
  a set of image acquisition devices configured according to a predefined setting based on the second profile of the tyre to acquire data representative of at least part of a surface of the tyre,
  wherein the one or more first profile-acquisition devices are distinct from the one or more second profile-acquisition devices and from the set of image acquisition devices;
 a storage, wherein a plurality of known models of tyres is stored, to which corresponding settings are associated for the set of image acquisition devices; and
 a processor to inspect the tyre to search for any manufacturing defects based on said data representative of at least part of the surface of the tyre.

23. The checking line according to claim 22, wherein the one or more second profile-acquisition devices are a subset of the set of image acquisition devices.

24. The checking line according to claim 22, wherein the first profile-acquisition devices comprise a first part, wherein the set of image acquisition devices, the second profile-acquisition devices, and the first part of the first profile-acquisition devices are operatively associated with respective support and moving devices and wherein the support and moving devices comprise at least one robotized arm.

25. The checking line according to claim 24, wherein the first profile-acquisition devices comprise a second part supported by fixed support devices and wherein the second part of the first profile-acquisition devices acquires a part of a radially outer surface of the tyre, while moving in an advancing direction.

26. The checking line according to claim 25, wherein the second part of the first profile-acquisition devices forms two slit lights on a plane substantially perpendicular to the advancing direction of the tyre, wherein the two slit lights illuminate the part of the radially outer surface of the tyre, while advancing along the advancing direction.

27. The checking line according to claim 22, wherein a part of the plurality of checking stations comprises a support for the tyre to rotate the tyre about an axis of rotation and wherein the support is adapted to rotate the tyre about the axis of rotation with respect to a first part of the first profile-acquisition devices, to the second profile-acquisition devices, and to the set of image acquisition devices.

28. The checking line according to claim 27, wherein the support comprises a conveyor belt to carry the tyre along an advancing direction.

29. The checking line according to claim 22, wherein the plurality of checking stations comprises a first checking unit and a second checking unit, wherein each of the first checking unit and the second checking unit comprise the set of image acquisition devices, the first profile-acquisition devices, and the second profile-acquisition devices.

30. The checking line according to claim 29, further comprising an overturning and transport device, wherein the overturning and transport device is located between the first checking unit and the second checking unit and overturns the tyre about an overturning axis.

31. The checking line according to claim 29, wherein the first checking unit and the second checking unit are respectively operated on at least a first axial half of the tyre and on at least a second axial half of the tyre.

\* \* \* \* \*